United States Patent
Uehara et al.

(10) Patent No.: US 7,420,741 B2
(45) Date of Patent: Sep. 2, 2008

(54) IMAGE DISPLAY DEVICE AND PORTABLE TERMINAL DEVICE

(75) Inventors: Shin-Ichi Uehara, Tokyo (JP); Naoyasu Ikeda, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 11/168,932

(22) Filed: Jun. 29, 2005

(65) Prior Publication Data
US 2006/0001974 A1 Jan. 5, 2006

(30) Foreign Application Priority Data
Jun. 30, 2004 (JP) ............... 2004-193095

(51) Int. Cl.
*G02B 27/10* (2006.01)
(52) U.S. Cl. ..................................... 359/619
(58) Field of Classification Search ............ 359/619, 359/455, 427
See application file for complete search history.

(56) References Cited

U.S. PATENT DOCUMENTS

| | | | |
|---|---|---|---|
| 6,239,851 B1 * | 5/2001 | Hatazawa et al. | 349/62 |
| 6,335,999 B1 * | 1/2002 | Winston et al. | 385/146 |
| 2004/0041747 A1 * | 3/2004 | Uehara et al. | 345/6 |
| 2004/0165264 A1 * | 8/2004 | Uehara et al. | 359/462 |
| 2004/0169670 A1 * | 9/2004 | Uehara et al. | 345/697 |
| 2004/0184146 A1 * | 9/2004 | Uehara et al. | 359/462 |
| 2005/0099688 A1 * | 5/2005 | Uehara et al. | 359/462 |
| 2005/0111100 A1 * | 5/2005 | Mather et al. | 359/464 |

FOREIGN PATENT DOCUMENTS

| | | | |
|---|---|---|---|
| EP | 1248473 A1 | * | 10/2002 |
| JP | 5-264991 | | 10/1993 |
| JP | 7-72334 | | 3/1995 |
| JP | 8-314034 | | 11/1996 |
| JP | 11-52380 | | 2/1999 |

OTHER PUBLICATIONS

Nikkei Electronics, Jan. 6, 2003, No. 838, pp. 26-27.
Chihiro Masuda, "Three-Dimensional Display", Sangyo Tosho Kabushiki Kaisha, p. 1.
Akira Tanaka, "The latest trend of backlights for liquid crystals", Monthly Display, Jun. 1997, p. 75.
Japanese Office Action dated Oct. 23, 2007 with partial English translation.

* cited by examiner

*Primary Examiner*—Hung Dang
*Assistant Examiner*—Vipin M Patel
(74) *Attorney, Agent, or Firm*—McGinn IP Law Group, PLLC

(57) ABSTRACT

An image display device is including a display panel in which a plurality of display units including at least pixels for displaying an image for a first point of view and a second point of view are arrayed in a matrix shape, a lens for distributing lights transmitted through pixels for the first point of view and lights transmitted through pixels for the second point of view into mutually different directions, and an illuminating member which is arranged on a back of the display panel and on whose face toward the display panel a plurality of convexes or concaves are formed, wherein a following formula is satisfied regarding the distance V between adjoining convexes or concaves in the illuminating member, where S is the distance between the pixels and the convexes or concaves, f is the focal distance of the lens, and L is the array cycle of the lens $$V \leq L \times S/f.$$

24 Claims, 18 Drawing Sheets

2: DISPLAY PANEL
3a: CYLINDRICAL LENSES
10: 3D IMAGE DISPLAY DEVICE
42: RIGHT-EYE PIXELS
61, 62: GROUP OF LIGHT RAYS
3: LENTICULAR LENS
5: BACKLIGHT UNIT
41: LEFT-EYE PIXELS
51: OPTICAL SHEET

2: DISPLAY PANEL
3a: CYLINDRICAL LENSES
10: 3D IMAGE DISPLAY DEVICE
42: RIGHT-EYE PIXELS
61, 62: GROUP OF LIGHT RAYS

3: LENTICULAR LENS
5: BACKLIGHT UNIT
41: LEFT-EYE PIXELS
51: OPTICAL SHEET

9: PORTABLE TERMINAL DEVICE

2: DISPLAY PANEL 5: BACKLIGHT UNIT
8: FLY-EYE LENS 20: 3D IMAGE DISPLAY DEVICE
41: LEFT-EYE PIXELS 42: RIGHT-EYE PIXELS
51: OPTICAL SHEET

8: FLY-EYE LENS

3: LENTICULAR LENS
30: 3D IMAGE DISPLAY DEVICE
42: RIGHT-EYE PIXELS
3a: CYLINDRICAL LENSES
41: LEFT-EYE PIXELS
51: OPTICAL SHEET

5: BACKLIGHT UNIT    51: OPTICAL SHEET

40: 3D IMAGE DISPLAY DEVICE    52: OPTICAL SHEET

2: DISPLAY PANEL
3a: CYLINDRICAL LENSES
41: LEFT-EYE PIXELS
50: 3D IMAGE DISPLAY DEVICE

3: LENTICULAR LENS
5: BACKLIGHT UNIT
42: RIGHT-EYE PIXELS
51: OPTICAL SHEET

2: DISPLAY PANEL
8: FLY-EYE LENS
42: RIGHT-EYE PIXELS
5: BACKLIGHT UNIT
41: LEFT-EYE PIXELS
60: 3D IMAGE DISPLAY DEVICE

3a: CYLINDRICAL LENSES
11: LONGITUDINAL DIRECTION
9: PORTABLE TERMINAL DEVICE
12: LATERAL DIRECTION

2: DISPLAY PANEL  
3a: CYLINDRICAL LENSES  
70: IMAGE DISPLAY DEVICE  
3: LENTICULAR LENS  
5: BACKLIGHT UNIT

104: VIEWER
105: PARALLAX BARRIER
105a: SLITS
106: DISPLAY PANEL
107: 3D VISIBLE AREA
107a: INTERSECTION POINT OF DIAGONAL LINES
107b: OPTIMAL VIEWING PLANE
143: MIDDLE POINT BETWEEN RIGHT EYE 141 AND LEFT EYE 142
181, 182: LUMINOUS FLUXES

121: LENTICULAR LENS   122: CYLINDRICAL LENSES

106: DISPLAY PANEL
122: CYLINDRICAL LENSES
124: LEFT-EYE PIXELS
121: LENTICULAR LENS
123: RIGHT-EYE PIXELS
112: HORIZONTAL DIRECTION

107: 3D VISIBLE AREA
142: LEFT EYE
172: LEFT-EYE AREA

141: RIGHT EYE
171: RIGHT-EYE AREA

106: DISPLAY PANEL
121: LENTICULAR LENS
125: PIXELS FOR FIRST POINT OF VIEW
104: VIEWER
122: CYLINDRICAL LENSES
126: PIXELS FOR SECOND POINT OF VIEW

2 : DISPLAY PANEL    3 : LENTICULAR LENS
5 : BACKLIGHT UNIT   51 : OPTICAL SHEET

IMAGE DISPLAY DEVICE AND PORTABLE TERMINAL DEVICE

BACKGROUND OF THE INVENTION

1. Field of the Invention

The present invention relates to an image display device capable of displaying an image toward a plurality of points of view and a portable terminal device mounted with this image display device.

2. Description of the Related Art

Attempts have been made to develop an image display device capable of displaying different images toward a plurality of points of view. One example is a three-dimensional image display device. The three-dimensional image display device displays parallax images for the right eye and left eye, and a viewer looking with both eyes at the images differentiated between right and left can perceive a three-dimensional image.

To realize this function concretely, many three-dimensional image display systems have been studied. Three-dimensional image display systems can be broadly classified into two types, one using glasses and the other using no glasses. The former can be further subdivided into the anaglyph type utilizing differences in color and the polarization glass type. But both of them have the essential problem that the viewer must use glasses. For this reason, the latter, using no glasses, has become more popular, and this can be subclassified into the parallax barrier type and the lenticular lens type.

First will be described the parallax barrier type. The parallax barrier type was conceived by Berthier in 1896 and verified by Ives in 1903. FIG. 12 is an optical model diagram illustrating a three-dimensional display method by the parallax barrier system. As shown in FIG. 12, a parallax barrier 105 is an optical barrier in which many vertical strip-shaped apertures, namely slits 105a, are formed. Near one surface of this parallax barrier 105, there is arranged a display panel 106. In the display panel 106, pixels for the right eye (hereinafter "right-eye pixels") 123 and pixels for the left eye (hereinafter "left-eye pixels") 124 are arranged in the direction orthogonal to the lengthwise direction of the slits 105a. Near the other surface of the parallax barrier 105, namely on the reverse side to the display panel 106, there is arranged a light source 108.

Lights emitted from the light source 108 are partly intercepted by the parallax barrier 105. On the other hand, a part of the lights having passed the slits 105a without being intercepted by the parallax barrier 105 passes the right-eye pixels 123 to become luminous fluxes 181 or pass the left-eye pixels 124 to become luminous fluxes 182. The position of the viewer to be able to perceive a three-dimensional image then is determined by the positional relationship between the parallax barrier 105 and the pixels. Thus, it is necessary for the right eye 141 of the viewer 104 to be within the area where all the luminous fluxes 181 matching a plurality of right-eye pixels 123 pass and the viewer's left eye 142 to be within the area where all the luminous fluxes 182 pass. The viewer can perceive a three-dimensional image when the middle point 143 between the viewer's right eye 141 and left eye 142 is positioned within the rectangular three-dimensional visible area 107 shown in FIG. 12.

The line segment which passes the intersection point 107a of diagonal lines in the three-dimensional visible area 107 is the longest, out of the line segments which extend in the arraying direction of the right-eye pixels 123 and the left-eye pixels 124 in the three-dimensional visible area 107. For this reason, since the tolerance for lateral deviations of the viewer's position is at its maximum when the middle point 143 is located at the intersection point 107a, this is the most preferable position of viewing.

Therefore, by this three-dimensional image display method, this distance between the intersection point 107a and a display panel 106 is regarded as an optimal viewing distance OD, and the viewer is recommended to watch an image at this distance. A hypothetical plane whose distance from the display panel 106 constitutes the optimal viewing distance OD in the three-dimensional visible area 107 is referred to as the optimal viewing plane 107b. This causes lights from the right-eye pixels 123 and the left-eye pixels 124 to reach the viewer's right eye 141 and left eye 142, respectively. As a result, the viewer is enabled to perceive the image displayed on the display panel 106 as a three-dimensional image.

For instance, Table 1 in *Nikkei Electronics*, Jan. 6, 2003, No. 838, pp. 26-27 (Reference 2) contains a cellular phone mounted with a 3D-compatible liquid crystal panel. The liquid crystal display panel constituting the three-dimensional image display device in this cellular phone measures 2.2 inches diagonally and has respectively 176 display dots horizontally and 220 display dots vertically. There is further provided a liquid crystal panel for the switching purpose to turn on and off the effect of a parallax barrier, permitting changeover between three-dimensional and two-dimensional displays.

Next will be described the lenticular lens type. The lenticular lens type was invented in or around 1910 by Ives and others as described in, for instance, Chihiro Masuda, *Three-Dimensional Display*, Sangyo Tosho Kabushiki Kaisha, p. 1 (Reference 1). FIG. 13 shows a perspective view of a lenticular lens, and FIG. 14 is an optical model diagram illustrating a three-dimensional display method by the lenticular lens type. As shown in FIG. 13, one face of a lenticular lens 121 is planar, and a plurality of convex semicircular cylindrical lenses 122, extending in one direction, are formed in parallel to one another on the other face.

Then, as shown in FIG. 14, in a three-dimensional image display device of the lenticular lens type, there are arranged the lenticular lens 121, a display panel 106 and the light source 108 in the order away from the viewer, and pixels of the display panel 106 are positioned on the focal plane of the lenticular lens 121. On the display panel 106, the pixels 123 for displaying the image for the right eye 141 and the pixels 124 for displaying that for the left eye 142 are alternately arranged. In this arrangement each group consisting of a pixel 123 and a pixel 124 adjoining each other matches one or another of the cylindrical lenses (convexes) 122 of the lenticular lens 121. This arrangement enables lights emitted from the light source 108 and having passed the pixels to be divided by the cylindrical lenses 122 of the lenticular lens 121 into the directions toward the right and left eyes and enables the right and left eyes to perceive different images. The viewer is thereby enabled to perceive a three-dimensional image. The system by which the viewer is enabled to perceive a three-dimensional image by displaying an image for the right eye and another for the left eye is known as a two-viewpoint system because the formation of two points of view are involved.

Next will be described in detail the size of each part of the three-dimensional image display device equipped with a conventional lenticular lens and a display panel. FIG. 15 is an optical model diagram of the three-dimensional image display device equipped with the conventional lenticular lens type, and FIG. 16 is an optical model diagram illustrating the three-dimensional visible area of this three-dimensional image display device.

As shown in FIG. 15, the distance between the vertex of the lenticular lens 121 and the pixels of the display panel 106 is represented by H, the refractive index of the lenticular lens 121 by n, the focal distance by f, and the array cycle of lens elements, namely the lens pitch, by L. Display pixels of the display panel 106 are arranged in a form of pairing one each of the left-eye pixel 124 and the right-eye pixel 123. The pitch of these pixels is represented by P.

Therefore, the array pitch of display pixels, of which each pair consists of one left-eye pixel 124 and one right-eye pixel 123 is 2P. One cylindrical lens 122 is arranged to match each pair of these one display pixels, consisting of one left-eye pixel 124 and one right-eye pixel 123.

The distance between the lenticular lens 121 and the viewer is supposed to be the optimal viewing distance OD, the expanded projection width of pixels at this distance OD, namely the width of each of the respective projected images of the left-eye pixels 124 and the right-eye pixels 123 on an imaginary plane at the distance OD from and parallel to the lens, is represented by e.

Further, the distance from the center of the cylindrical lens 122 positioned at the center of the lenticular lens 121 to the center of the cylindrical lens 122 positioned at an end of the lenticular lens 121 in the horizontal direction 112 is represented by WL, and the display panel 102, and the distance between the center of the paired display pixels consisting of a left-eye pixel 124 and a right-eye pixel 123 and the center of the display pixels positioned at an end of the display panel 106 in the lens array direction 112 is represented by WP. Then, the angle of incidence and the angle of emission of light at the cylindrical lens 122 positioned at the center of the lenticular lens 121 are represented by $\alpha$ and $\beta$, respectively, and the angle of incidence and the angle of emission of the cylindrical lens 122 at an end of the lenticular lens 121 in the lens array direction 112 are represented by $\gamma$ and $\delta$, respectively. Further the difference between the distances WL and WP is represented by C, and the number of pixels contained in the area of the distance WP, by 2 m.

Since the array cycle L of the cylindrical lenses 122 and the array cycle P of pixels are correlated, one is the basis of determining the other, but the lenticular lens is often designed to match the display panel, the array cycle P of pixels is treated as a constant. The refractive index n is determined by selecting a material for the lenticular lens 121. Unlike these factors, the viewing distance OD between the lens and the viewer and the expanded projection width of pixels e at the viewing distance OD are set to desired values. These values are used in determining the distance H between the lens vertex and the pixels and the lens pitch L. According to the Snell laws of refraction and geometrical relationships, the following Formulas 1 through 6 hold.

$n \times \sin \alpha = \sin \beta$ (Formula 1)

$OD \times \tan \beta = e$ (Formula 2)

$H \times \tan \alpha = P$ (Formula 3)

$n \times \sin \gamma = \sin \delta$ (Formula 4)

$H \times \tan \gamma = C$ (Formula 5)

$OD \times \tan \delta = WL$ (Formula 6)

The following Formulas 7 through 9 also hold.

$W_P - W_L = C$ (Formula 7)

$W_P = 2 \times m \times P$ (Formula 8)

$W_L = m \times L$ (Formula 9)

From Formulas 1 through 3 above derive the following Formulas 10 through 12, respectively.

$\beta = \arctan(e/OD)$ (Formula 10)

$\alpha = \arcsin(1/n \times \sin \beta)$ (Formula 11)

$H = P/\tan \alpha$ (Formula 12)

From Formula 6 and Formula 9 above derives the following Formula 13.

$\delta = \arctan(mL/OD)$ (Formula 13)

Further from Formula 7 and Formula 8 above derives the following Formula 14.

$C = 2 \times m \times P - m \times L$ (Formula 14)

Further from Formula 5 above derives the following Formula 15.

$\delta = \arctan(C/H)$ (Formula 15)

Incidentally, as the distance H between the vertex of the lenticular lens and the pixels is usually equalized to the focal distance f of the lenticular lens, the following Formula 16 holds, and the radius of curvature of the lens, represented here by r, is figured out by the following Formula 17.

$f = H$ (Formula 16)

$r = H \times (n-1)/n$ (Formula 17)

As shown in FIG. 16, the area in which every light from the right-eye pixels 123 reaches is defined as the right-eye area 171, and the area in which every light from the left-eye pixels 124 reaches, as the left-eye area 172. If the viewer positions his right eye 141 in the right-eye area 171 and his left eye 142 in the left-eye area 172, then he can perceive a three-dimensional image.

However, as the distance between the viewer's two eyes is fixed, the right eye 141 and the left eye 142 cannot be positioned in every desired position in the right-eye area 171 and the left-eye area 172, respectively, but the visible range of the two eyes is limited to where the distance between the two eyes can be kept constant. Thus, only when the middle point between the right eye 141 and the left eye 142 is positioned in the three-dimensional visible area 107, is three-dimensional viewing possible. In the position where the distance from the three-dimensional image display device is equal to the optimal viewing distance OD, the length along the horizontal direction 112 in the three-dimensional visible area 107 is the longest, and therefore the tolerance for the deviation of the viewer's position in the horizontal direction 112 is the greatest here. For this reason, the position where the distance from the three-dimensional image display device is equal to the optimal viewing distance OD is the ideal position of observation.

While the parallax barrier system previously described "conceals" unnecessary lights with the barrier, the lenticular lens system changes the traveling direction of lights, and by its very principle is free from any decrease in the brightness of the display screen due to the presence of the lenticular lens. For this reason, it is considered to have good prospects for application to portable apparatuses, whose requirements for high luminance displaying and low power consumption are particularly stringent.

A three-dimensional image display device developed by using the lenticular lens type is described in Reference 2 cited above. The liquid crystal display panel constituting this three-dimensional image display device measures seven inches in diagonal length, and has 800 display dots horizontally and 480 vertically. By varying the distance between the lenticular lens and the liquid crystal display panel by 0.6 mm, switchover between three-dimensional and two-dimensional displays can be accomplished.

As another example of an image display device capable of displaying different images toward a plurality of points of view, a device simultaneously displaying a plurality of images is disclosed (see the Japanese Patent Application Laid-Open No. Hei 6-332354 (see FIG. 9 thereof)). The display simultaneously displays two-dimensional images, differing from one viewing direction to another, in the same conditions by utilizing the image portioning-out function of the lenticular lens, and thereby enables a plurality of different viewers to watch at the same time different two-dimensional images in respectively different directions with a single display device.

FIG. 17 shows a perspective view of this simultaneous display of a plurality of images. As shown in FIG. 17, in this simultaneous display of a plurality of images, the lenticular lens 121 and the display panel 106 are arranged in the direction away from the viewer 104. On the display panel 106, pixels 125 for a first point of view to display an image for a first point of view and pixels 126 for a second point of view to display an image for a second point of view are alternately arranged. In this arrangement each group consisting of a pixel 125 and a pixel 126 adjoining each other matches one or another of the cylindrical lenses (convexes) 122 of the lenticular lens 121. As this arrangement enables lights transmitted through the pixels to be divided by the cylindrical lenses 122 of the lenticular lens 121 into different directions, the viewers can perceive different images in different positions. The use of this simultaneous display of a plurality of images can save an installation space, electric power charge and so forth compared with the installation of as many display devices as the viewers.

On the other hand, liquid crystal display devices, by virtue of their low power consumption and other advantages, find especially extensive use in smaller-size items including portable terminals. A liquid crystal display panel requires some external light source because it is a non-self-luminescent type, which displays an image by modulating external lights. In a common transmissive liquid crystal display panel is equipped with illuminating means, known as a backlight unit, on the rear side of the liquid crystal display panel as seen from the viewer's side (see Akira Tanaka, "The latest trend of backlights for liquid crystals", *Monthly Display*, June 1997; p. 75 (Reference 3)).

FIG. 1 in Reference 3 illustrates the structure of a backlight unit for liquid crystal panel use. Usually, a backlight unit is configured of a light guiding plate for propagating lights from a light emitting source, the light emitting source known as an edge light (side light) arranged on a side of the light guiding plate, and an optical sheet arranged on the viewer's side of the light guiding plate. While the light emitted from the edge light propagates along the light guiding plate, part of the light is emitted toward the viewer, passes the transmissive liquid crystal display panel after being shaped by the optical sheet in terms of such optical characteristics as uniformity and angle distribution, and is incident on the viewer.

FIG. 18 is an optical model diagram illustrating a conventional three-dimensional display device using a lenticular lens. As described in Reference 3, a prism sheet or a lens sheet, respectively consisting of many prisms or lenses, is frequently used as the optical sheet for the backlight unit. As shown in FIG. 18, on the surface of such a prism sheet or lens sheet, there are convexes or concaves deriving from the structure of the prisms or lenses.

However, the examples of the prior art described above involve problems. A portable terminal device is required to be thin to enhance their portability, and accordingly image display devices to be mounted on the portable terminal devices are also required to be thin.

SUMMARY OF THE INVENTION

In view of the foregoing and other exemplary problem, the present inventors tried a reduction in the distance between the pixels and the backlight unit, and found a problem that stripes emerge in the displayed images, and that the stripes cause a serious deterioration in display quality.

Accordingly exemplary feature of the present invention, attempted in view of these problems, is to provide an image display device which is thin and having excellent display quality and a portable terminal device equipped with this image display device.

A first exemplary aspect of the invention relates to an image display device including a display panel in which a plurality of display units including at least pixels for displaying an image for a first point of view and a second point of view are arrayed in a matrix shape; a lens for distributing lights transmitted through pixels for the first point of view and lights transmitted through pixels for the second point of view into mutually different directions; and an illuminating member which is arranged on the back of the display panel and on whose face toward the display panel a plurality of convexes or concaves are formed.

Herein the following Formula 18 holds true regarding the distance V between adjoining convexes or concaves in the illuminating member, where S is the distance between the pixels and the convexes or concaves, f is the focal distance of the lens, and L is the array cycle of the lens:

$$V \leq L \times S / f \quad \text{(Formula 18)}$$

Thus, the relationship between the spacing of convexes or that of concaves, and the array cycle of the lens is so set that the spacing of convexes be smaller than a prescribed value determined by the ratio between the distance between pixels and the convexes and the focal distance of the lens. Whereas lights emitted from the illuminating member differ in directionality distribution with the inclination angle of the convexes, the distance V defined by Formula 18 can reduce the influence of the directionality distribution of emitted lights attributable to the convexes. Thus, by satisfying the condition of Formula 18, the number of convexes projected by one lens on the viewing plane can be made one or more, and accordingly the influence of distribution can be evened out. In this way, the invention can reduce the thickness of the image display device without sacrificing its display quality.

The focal distance f may be shorter than the distance between the lens and the pixels. This would enable the focal positions of the lens to be set closer than the pixels toward the lens and accordingly a broader range of light rays to be used on the illuminating member. As a result, the distance between adjoining convexes may be extended, and therefore the image display device can be reduced in thickness without sacrificing its display quality because it can serve to reduce the influence of the directionality distribution of emitted lights attributable to convexes. Furthermore, as the focal position of the lens is off the pixel surface, the non-display areas between pixels can be vague, and accordingly the deterioration of displayed images attributable to the non-display areas can also be prevented.

Where concaves are used instead of convexes to pick up emitted lights, the convexes in the foregoing description can be read as "concaves" to explain the same effects.

An image display device according to a second exemplary aspect of the invention includes a display panel in which a plurality of display units including at least pixels for displaying an image for a first point of view and a second point of view are arrayed in a matrix shape; a lens for distributing lights transmitted through pixels for the first point of view and lights transmitted through pixels for the second point of view into mutually different directions; and an illuminating member which is arranged on the back of the display panel and on whose face toward the display panel a plurality of convexes or concaves are regularly formed, wherein the distance between adjoining convexes or concaves on the illuminating member is not longer than 0.6 mm.

The invention, which may use a transmissive liquid crystal panel of 0.15 mm in pixel pitch, the pitch most frequently used today in display panels for portable terminals, and of 0.3 mm in the array cycle of the lens, and in which display pixels include two types of pixels, can reduce the thickness of image display devices without sacrificing their display quality.

The lens may be a fly-eye lens in which a plurality of convex lenses are arrayed in a matrix shape. As this enables lights transmitted through the lens to be distributed in four directions, different images, can be displayed, distributed two-dimensionally.

An image display device according to a third exemplary aspect of the invention includes a display panel in which a plurality of display units including at least pixels for displaying an image for a first point of view and a second point of view are arrayed in a matrix shape; a lenticular lens provided with cylindrical lenses for distributing lights transmitted through pixels for the first point of view and lights transmitted through pixels for the second point of view into mutually different directions; and an illuminating member which is arranged on the back of the display panel and on whose face toward the display panel a plurality of convexes or concaves, inclined by an angle $\theta$ to the lengthwise direction of the cylindrical lenses, are formed, wherein the following Formula 19 holds true regarding the distance V between adjoining convexes or concaves in the illuminating member, where S is the distance between the pixels and the convexes or concaves, f is the focal distance of the lens, L is the array cycle of the lens, and $P_v$ is the pixel pitch in the lengthwise direction of the cylindrical lenses:

$$V \leq L \times S \times (\cos \theta)/f + Pv \times (\sin \theta) \quad \text{(Formula 19)}$$

According to the invention, by utilizing the one-dimensional lens action of the cylindrical lenses, deterioration in display quality attributable to the convexes or concaves of the illuminating member can be prevented.

An image display device according to a fourth exemplary aspect of the invention includes a display panel in which a plurality of display units including at least pixels for displaying an image for a first point of view and a second point of view are arrayed in a matrix shape; a lenticular lens provided with cylindrical lenses for distributing lights transmitted through pixels for the first point of view and lights transmitted through pixels for the second point of view into mutually different directions; and an illuminating member which is arranged on the back of the display panel and on whose face toward the display panel a plurality of convexes or concaves are formed, wherein the following Formula 20 holds true regarding the distance $V_v$ between adjoining convexes or concaves in the illuminating member in a direction inclined by an angle $\theta$ to the lengthwise direction of the cylindrical lenses and the following Formula 21 holds true regarding the distance V between adjoining convexes or concaves in the illuminating member in a direction orthogonal to the direction inclined by the angle (to the lengthwise direction of the cylindrical lenses, where S is the distance between the pixels and the convexes or concaves, f is the focal distance of the lens, L is the array cycle of the lens, and $P_v$ is the pixel pitch in the lengthwise direction of the cylindrical lenses:

$$V_v \leq P_v/\cos \theta \quad \text{(Formula 20)}$$

$$V \leq L \times S \times (\cos \theta)/f + P_v \times (\sin \theta) \quad \text{(Formula 21)}$$

The focal distance f may be shorter than the distance between the lenticular lens and the pixels. This would enable the focal positions of the lens to be set closer than the pixels toward the lens, and accordingly a broader range of light rays to be used on the illuminating member. As a result, the distance between adjoining convexes may be extended, and therefore the image display device can be reduced in thickness without sacrificing its display quality because it can serve to reduce the influence of the directionality distribution of emitted lights attributable to convexes or concaves. Furthermore, as the focal position of the lens is off the pixel surface, the influence of the non-display areas between pixels can be eased, and accordingly the deterioration of displayed images attributable to the non-display areas can also be prevented.

The present invention enables image display devices to be reduced in thickness without sacrificing their display quality because it can serve to reduce the influence of the directionality distribution of emitted light rays, attributable to convexes or concaves formed in the illuminating member.

DETAILED DESCRIPTION OF THE EXEMPLARY EMBODIMENTS

Figure 16:
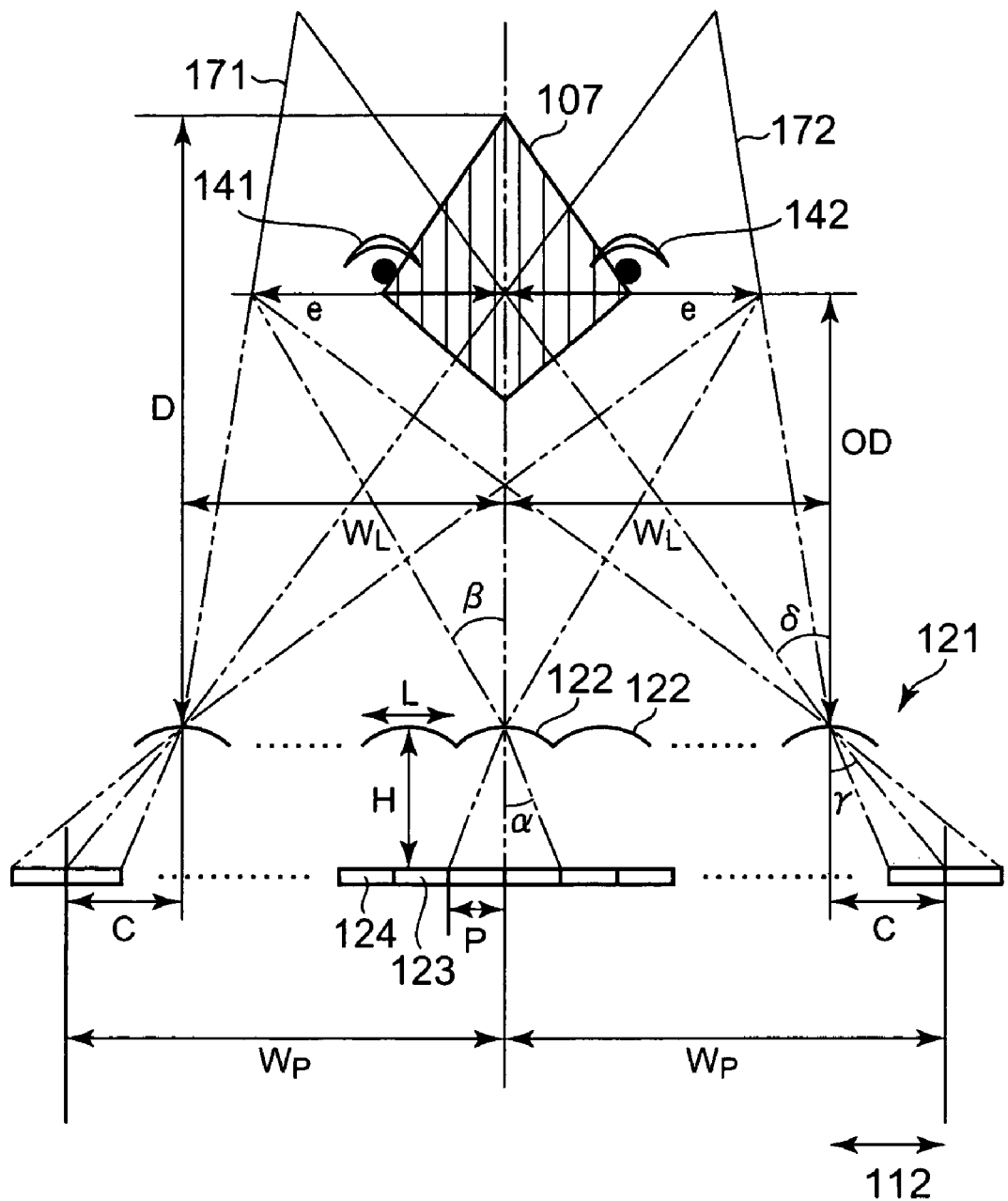
FIG. 16 is an optical model diagram illustrating the three-dimensional visible area of the twin-lens three-dimensional image display device shown in FIG. 15.
Figure 17:
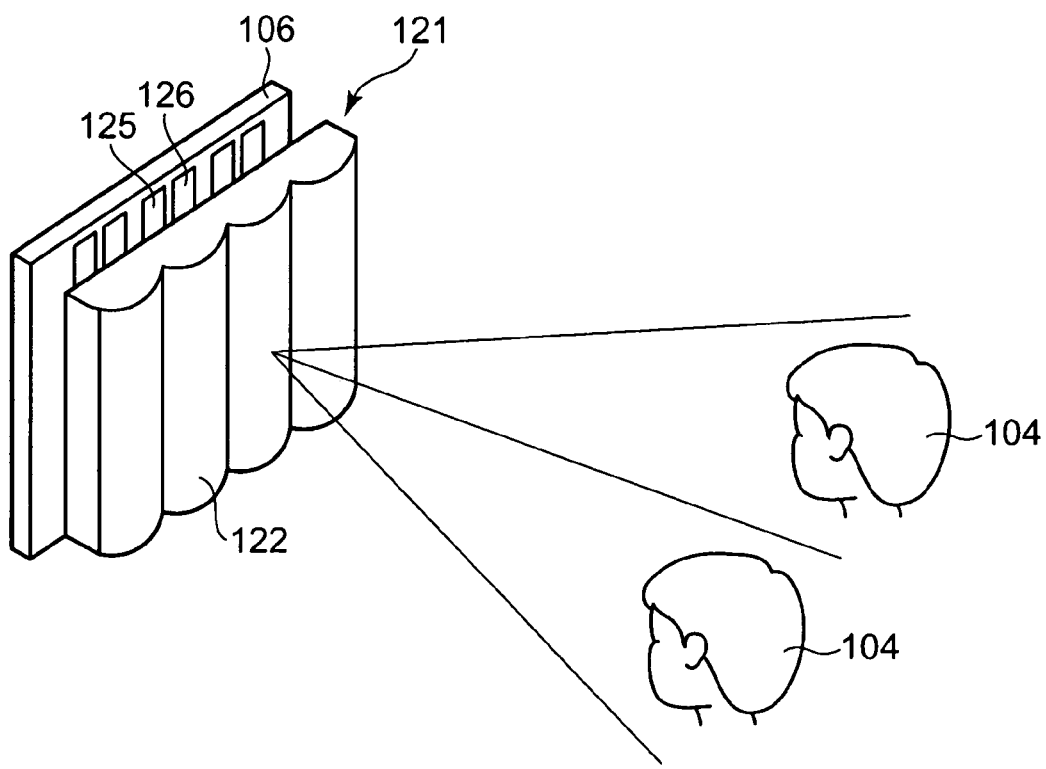
FIG. 17 shows a perspective view of simultaneous display of a plurality of images.

With a view to solving the problems noted above, the present inventors made earnest studies to reduce the thicknesses of image display devices, such as the three-dimensional image display device and the simultaneous display of a plurality of images described above, and to mount such displays on portable terminal devices. As a result, the following findings regarding the emergence of stripes in displayed images were obtained. In a three-dimensional image display device, if the purpose is merely to display a three-dimensional image, it will be sufficient to consider only an optical model on the pixels-to-the viewer side as shown in FIG. 16. However, if the device is to be reduced in thickness and enhanced in picture quality, the distances from the display pixels (right-eye pixels 42 and left-eye pixels 41) to an optical sheet 51 provided on a backlight unit 5, and the shape of convexes formed on the surface of the optical sheet 51, as shown in FIG. 1 should be considered.

First Exemplary Embodiment

Image display devices, which are exemplary embodiments of the present invention, will be described below in specific terms with reference to the accompanying drawings. First will be described a three-dimensional image display device, which is a first exemplary embodiment of the invention. FIG. 1 shows an optical model of the three-dimensional image display device embodying the invention in this mode. In FIG. 1, illustration of other constituent elements than pixels in the display panel is dispensed with in order to make the drawing easier to perceive.

Figure 1:
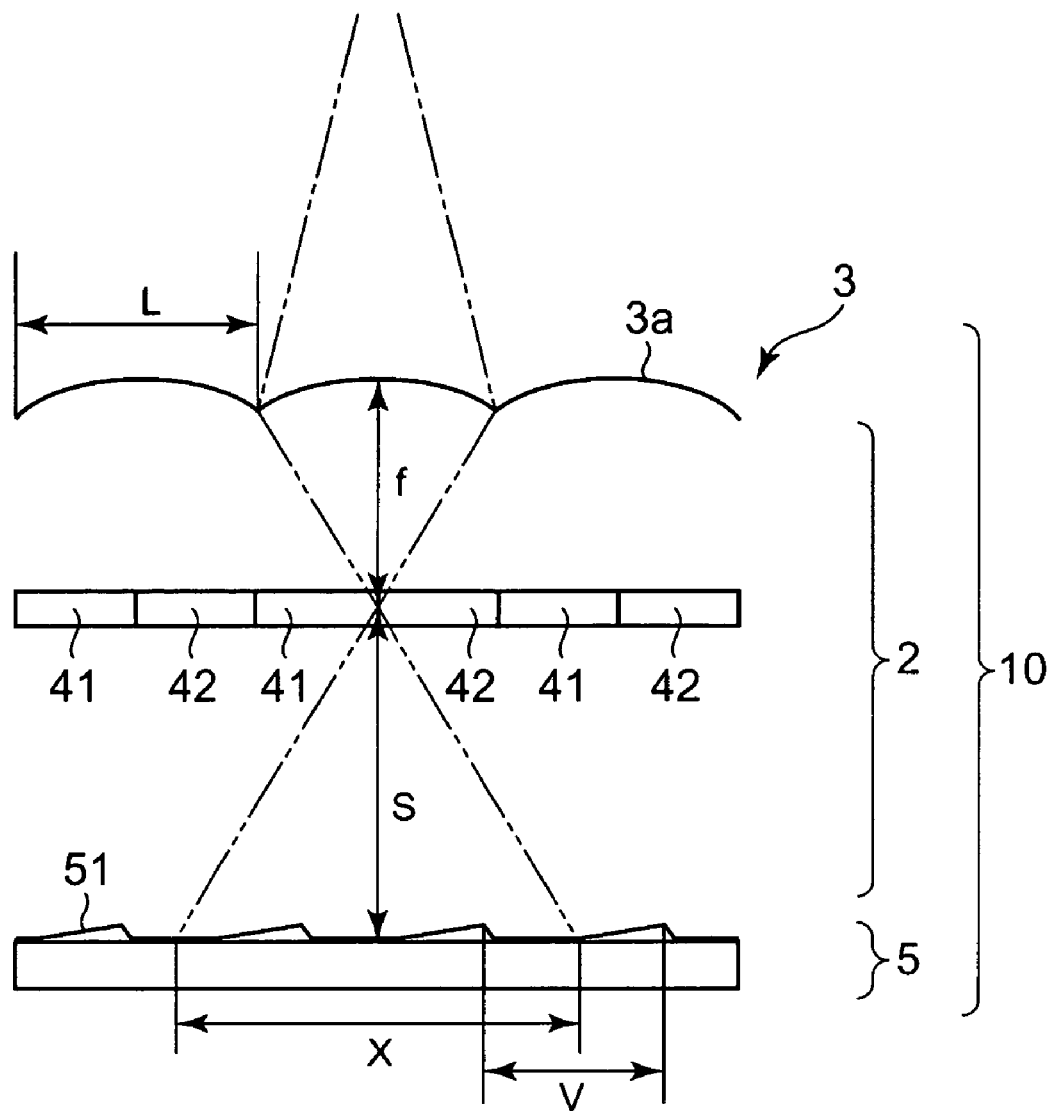
FIG. 1 is an optical model diagram illustrating a three-dimensional image display device, which is a first exemplary embodiment of the present invention.

As shown in FIG. 1, in the three-dimensional image display device 10 embodying the invention in this mode, a lenticular lens 3, a display panel 2 and a backlight unit 5 are disposed in this order away from the viewer. The display panel 2 in this image display device 1 may be a transmissive liquid crystal panel for instance, and the display pixels on the display panel may include mutually adjoining right-eye pixels 42 and left-eye pixels 41. Each group of display pixels are arrayed in the lengthwise direction of cylindrical lenses 3*a*, and a lenticular lens 3 is so arranged that one or another of the cylindrical lenses 3*a* matches each row of these arrayed display pixels.

On a face of the backlight unit 5 of the display panel 2 side, the optical sheet 51 on one face of which the convexes extending in one direction are formed, is so arranged that the face with the convexes come to the display panel 2 side. The shape of these convexes formed on the optical sheet 51 is prismatic for instance, and the distance between adjacent convexes, namely the repeating pitch of the convexes, is represented by V. In the image display device 10 of this exemplary embodiment, the display pixels are focused on, the focal distance f of the cylindrical lenses 3*a* forming the lenticular lens 3 is equal to the distance between the vertexes of the lenses and the display pixels.

Further, the convexes of the optical sheet 51 are arrayed in one direction, and their lengthwise direction is identical with that of the cylindrical lenses 3*a*. Thus, the convexes of the optical sheet 51 are arranged in the same direction as the cylindrical lenses 3*a*. The array cycle of the cylindrical lenses 3*a* being represented by L and the distance between the display pixels and the optical sheet 51 by S, the pitch V of the convexes on the optical sheet 51 satisfies the condition of the following Formula 24.

$$V \leq L \times S / f \quad \text{(Formula 24)}$$

Next will be described the operation of the three-dimensional image display device 10 according to the first exemplary embodiment with note taken of one point among the display pixels of the display panel 2. Lights emitted from the backlight unit 5 travel at many different angles. Therefore, light rays having passed a certain point among the display pixels are dispersed, and at the same time travel toward the lenticular lens 3. To take note of one of the cylindrical lenses 3*a* forming the lenticular lens 3, the group of light rays coming incident on that cylindrical lens 3*a* forms a triangle of which the base is the lens pitch L and the height is the focal distance f. On the other hand, the group of light rays emitted from the backlight unit 5 and directed toward the aforementioned one point among the display pixels also forms a triangle. The height of this triangle is the distance S from the display pixels to the optical sheet 51. Since these two triangles are similar to each other, the relationship of the following Formula 25 holds, where X is the length of this latter triangle.

$$L:f = X:S \quad \text{(Formula 25)}$$

The length X of the triangle represented by Formula 25 above is nothing but the right side of Formula 24 stated before.

Thus, in the three-dimensional image display device 10 embodying the invention in this mode, with note taken of one point among the display pixels of the display panel 2, the length X of the base of the triangle formed by the group of light rays emitted from the backlight unit 5 and being incident on the one point among the display pixels is not shorter than the pitch V of the prismatic convexes on the optical sheet 51 of the backlight unit 5.

Since the prismatic convexes on the optical sheet 51 differ in the angle of surface inclination from position to position, the directionality distribution of the lights emitted from the backlight unit 5 also differs from one position of emission to another. For instance, where the length X of the base of the triangle is shorter than the pitch V of the convexes, the effect of the directionality distribution of emitted lights dependent on the position of convex is greater. However, since the length X of the base of the triangle is not shorter than the pitch V of the convexes in the three-dimensional image display device 10 of this exemplary embodiment, the effect can be eased even if the directionality distribution differs with the position of emission, because it is averaged over one cycle or more.

Further, lights having passed the one point among the display pixels and passed the cylindrical lenses 3*a* are projected on the viewing plane, and match the one point among the display pixels on a one-to-one basis. Therefore, a finite range X on the optical sheet 51 matches a certain one point on the viewing plane, and the finite range X on the optical sheet 51 varies matching the point on the viewing plane. It is note that with the luminance distribution of the optical sheet 51 in a certain finite range X, if the directionality distribution, i.e.

the luminance distribution, of emitted lights differs with the position of the finite range X on the optical sheet, the brightness on the viewing plane will vary from position to position. Since this variation in brightness is observed superposed over the displayed image, picture quality seriously deteriorates.

To solve this problem, it is effective to uniformize the luminance distribution in the finite range X irrespective of its position on the optical sheet. As Formula 24 holds in the three-dimensional image display device 10 of this exemplary embodiment and the finite range X is set at or above the pitch V of the prismatic convexes on the optical sheet 51, the luminance distribution in the finite range X can be uniformized irrespective of its position on the optical sheet 51. This makes it possible to realize a thin image display device having excellent display quality.

Next will be described the advantages of the three-dimensional image display device 10 with reference to a two-viewpoint three-dimensional image display device using as the display panel 2 a transmissive liquid crystal display panel of which the glass substrate (not shown) is 0.7 mm thick and the pixel pitch is 0.15 mm, by way of example. The distance between the vertex of the lenticular lens 3 and the display pixels, and the focal distance f in this three-dimensional image display device are both equal to the thickness of the glass substrate (not shown), i.e. 0.7 mm.

Further, between the display pixels and the optical sheet 51, there are disposed, in addition to the aforementioned glass substrate (not shown), a polarizing plate (not shown), which is an important item for a transmissive liquid crystal display panel, a multi-layered optical film (not shown) for enhancing the luminance, and a light-transmissive sticky film (not shown) for fixing the backlight unit 5 and the liquid crystal display panel to each other in this order. Their thicknesses are 0.7 mm for the glass substrate, 0.3 mm for the polarizing plate, 0.2 mm for the optical film, and 0.2 mm for the sticky film.

Therefore, the distance S from the display pixels to the optical sheet 51, i.e. the minimum thickness to allow the arrangement of these members is 1.4 mm. According to Formula 24, by setting the convex 10, pitch V on the optical sheet 51 at or below 0.6 mm, the effect of the directionality distribution of the convex on the optical sheet 51 can be eased, making it possible to realize an image display device having excellent display quality.

Figure 18:
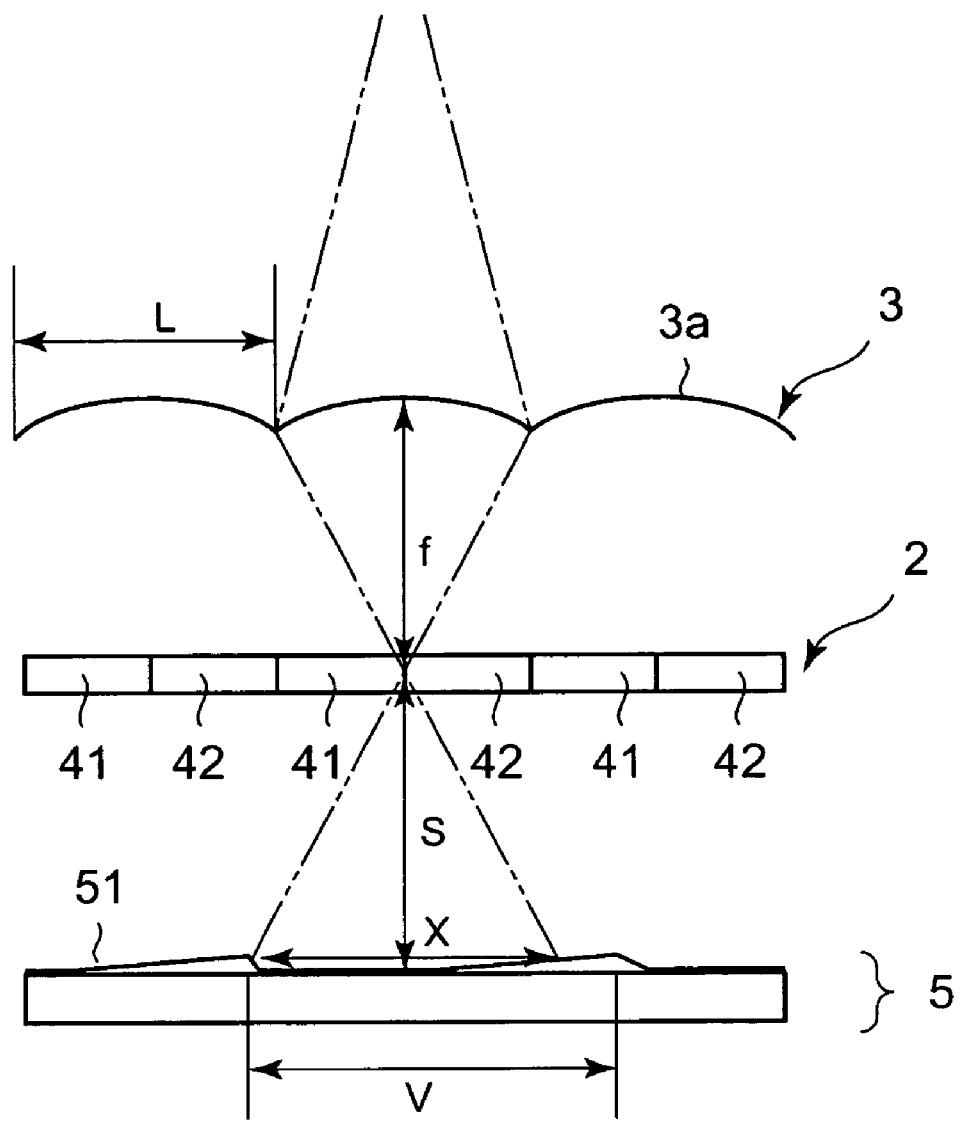
FIG. 18 is an optical model diagram illustrating a conventional three-dimensional display device using a lenticular lens.

On the other hand, if the convex pitch V of the optical sheet 51 is greater than 0.6 mm, the distance from the display pixels to the optical sheet 51 should be extended to prevent deterioration in display quality. If, for instance, the convex pitch V of the optical sheet 51 is 1 mm, greater than X, as shown in FIG. 18, the distance S from the display pixels to the optical sheet 51 should be 2 mm, resulting in a wasteful gap between the display pixels and the optical sheet 51 and a consequent increase in the thickness of the image display device.

Thus, by keeping the pitch of the convexes on the optical sheet 51 provided on the backlight unit 5 at or below 0.6 mm, a thin three-dimensional image display device is formed having excellent display quality.

Figure 2:
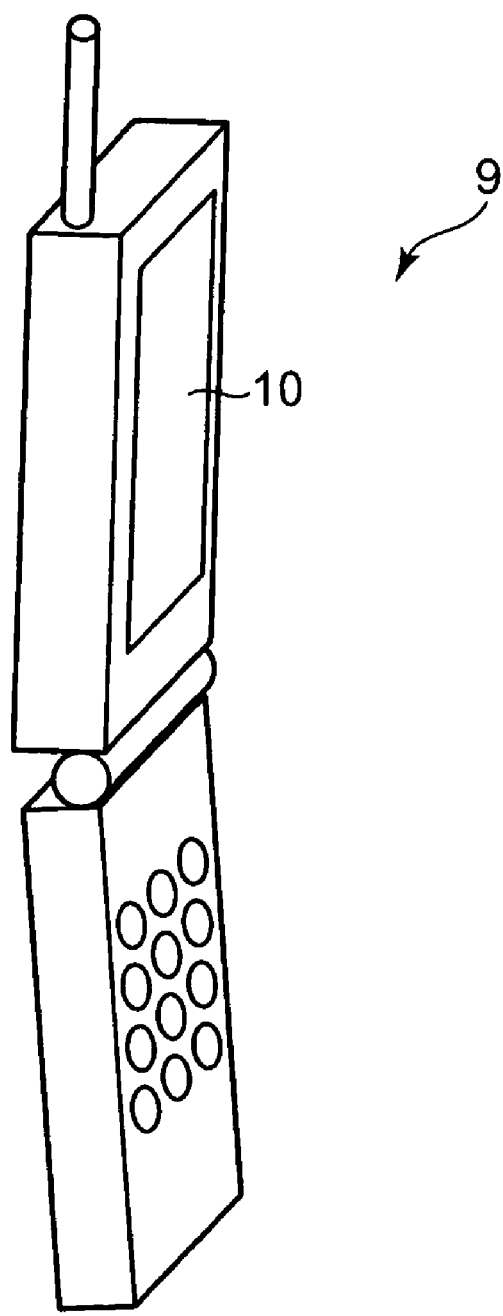
FIG. 2 shows a perspective view of a portable terminal device mounted with the three-dimensional image display device of FIG. 1.

FIG. 2 shows a perspective view of a portable terminal device mounted with the three-dimensional image display device shown in FIG. 1. As shown in FIG. 2, this three-dimensional image display device 10 is mounted on a portable terminal device 9, such as a cellular phone for example.

Although an optical sheet on whose surface prismatic convexes extending in one direction are formed is used in the three-dimensional image display device 10 of this exemplary embodiment, the invention is not limited to this configuration. For instance, two optical sheets on whose surfaces prismatic convexes extending in one direction each are formed can be so disposed on the backlight unit 5 that the extending directions of the convexes orthogonally cross each other in a planar view. In this case, the pitch V of the optical sheets, whose convexes extend in the same direction as the arraying direction of the cylindrical lenses 3a, may be within a range defined by Formula 24 above.

It is also possible to use an optical sheet on which prismatic convexes are arrayed in a matrix shape. For an illuminating member including an optical sheet on which convexes are formed is arranged on a backlight unit, the use of the optical sheet on which convexes are disposed in a matrix shape gives the same effect as optical sheets on which convexes extend in one direction are used in two layers. As a result, the number of constituent members can be reduced with a corresponding saving in cost.

Although the convexes are formed on the optical sheet 51 in the three-dimensional image display device 10 of this exemplary embodiment, the invention is not limited to this configuration. Where convexes are formed on the surface of a light guiding plate disposed on the backlight unit 5 for instance, the same effect can be achieved by keeping the pitch of the convexes within the range defined by Formula 24 above. If the convexes have an in-plane distribution, then it is preferable for the minimum value of the pitch V to satisfy the requirement of Formula 24 above. Hence, the image display device could have a smaller thickness without sacrificing its display quality even if the distance V has an in-plane distribution.

Further, the shape of the convexes is not limited to being prismatic, but instead convexes could be provided on the surface of the backlight unit 5, and the presence of the convexes results in a different directionality distribution of emitted lights in a microscopic region. Further a light dispersing member, more specifically an optical film or the like having a light scattering effect, could be formed over the convexes formed on the backlight unit 5. This would reduce the influences of the convexes.

Although the foregoing description referred to prismatic convexes, concaves shaped like inverted prisms would prove as effective.

Further, though a transmissive liquid crystal panel is supposed to be used as the display panel 2 in the three-dimensional image display device 10 of this exemplary embodiment, the invention is not limited to this, but can be applied to any display panel using the backlight unit 5. The liquid crystal panel can be driven by either an active matrix system such as a thin film transistor (TFT) system or the thin film diode (TFD) system, or by a passive matrix system such as the super-twisted nematic liquid crystal (STN) system. The image display device 1 in this exemplary embodiment can be applied not only to cellular phones or personal digital assistants (PDA) but also to various other portable terminals including game machines, digital still cameras, digital video cameras, note book computers, video players, DVD players, vending machines, monitors for medical use and ATMs (automated teller machine)

Second Exemplary Embodiment

Figure 3:
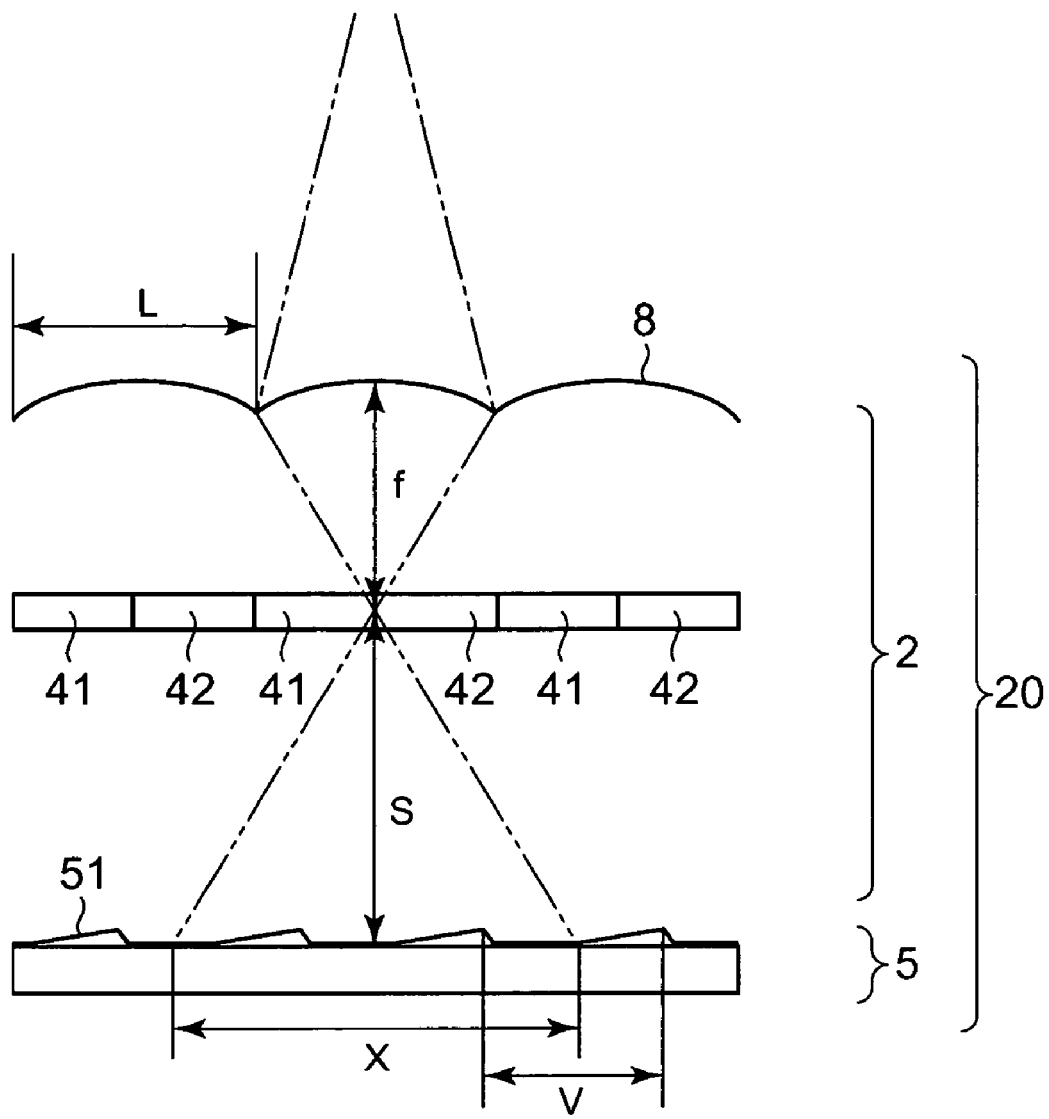
FIG. 3 is an optical model diagram illustrating a three-dimensional image display device, which is a second exemplary embodiment of the invention.
Figure 4:
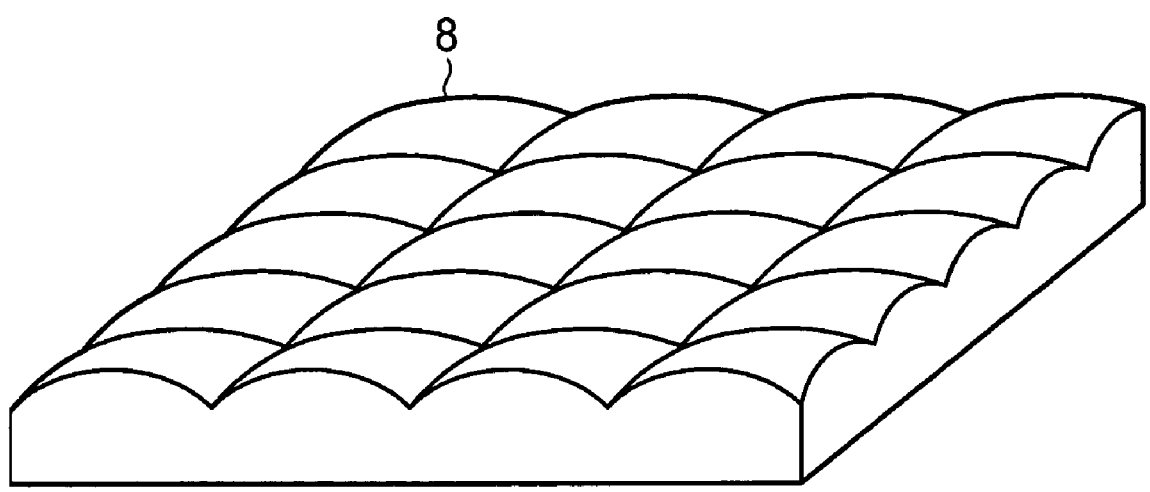
FIG. 4 shows a perspective view of a fly-eye lens.

Next will be described a three-dimensional image display device, according to the second exemplary embodiment of the present invention. FIG. 3 is an optical model diagram illustrating the three-dimensional image display device embodying the invention in this mode, and FIG. 4 shows a perspective view of a fly-eye lens. As shown in FIG. 3, a three-dimensional image display device 20 of this exemplary embodiment is the same as the three-dimensional image display device 10 of the first exemplary embodiment described above except that a fly-eye lens 8 in which constituent lenses are formed in a matrix shape is used instead of the lenticular lens. As the three-dimensional image display device 20 of this exemplary embodiment uses the fly-eye lens 8, it is possible to distribute the lights of pixels transmitted through the lenses in four directions, up and down, and right and left. As a result, even if the arranging direction of the three-dimensional image display device 20 is turned, three-dimensional images can still be displayed.

Incidentally, where the lens pitch of the fly-eye lens 8 differs with the arraying direction, it is preferable to keep the convex pitch V in the optical sheet 51 is preferably within the range of Formula 24 above in the decreasing direction of the pitch. In the three-dimensional image display device 20 of this exemplary embodiment, as in the three-dimensional image display device 10 of the first exemplary embodiment described above, the convexes formed on the surface of the optical sheet 51 may be arrayed either in one direction or in a matrix shape.

Where two optical sheets 51 on whose surfaces prismatic convexes are formed in one direction each are so disposed that the directions of the convexes orthogonally cross each other in a planar view, the pitch V of the optical sheet on the display panel 2 side is preferably within a range defined by Formula 24 above. That is, because the optical sheet on the display panel 2 side is shorter in distance to the display pixels, the condition for preventing the display quality from deterioration is more stringent.

Furthermore, the other aspects of the configuration and advantages of the three-dimensional image display device 20 of this exemplary embodiment than those described above are similar to those of the three-dimensional image display device 10 of the first exemplary embodiment described earlier.

Third Exemplary Embodiment

Figure 5:
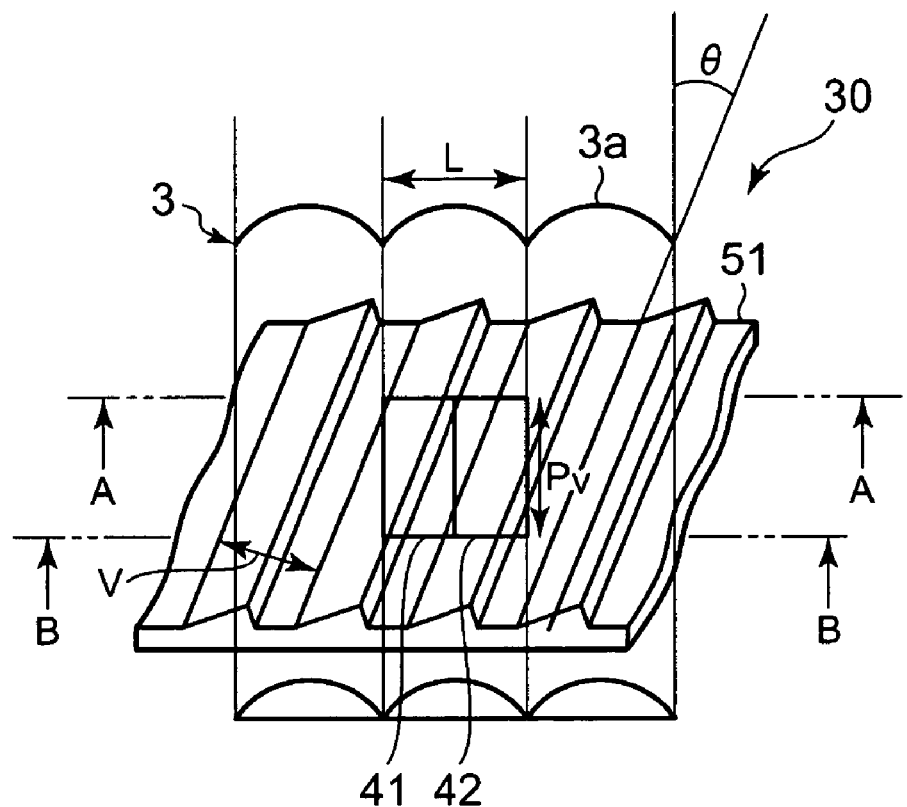
FIG. 5 shows a partial perspective view of a three-dimensional image display device, which is a third exemplary embodiment of the invention.

Next will be described a three-dimensional image display device, which is a third exemplary embodiment of the present invention. FIG. 5 shows a partial perspective view of the three-dimensional image display device, according to the third exemplary embodiment of the invention. Incidentally, FIG. 5 shows only part of the lenticular lens, part of the optical sheet and one pair of display pixels, but the illustration of all other constituent elements is dispensed with.

As shown in FIG. 5, in a three-dimensional image display device 30 of this exemplary embodiment, the lengthwise direction of the cylindrical lenses 3a forming the lenticular lens 3 is not identical with the direction in which prismatic convexes formed on the surface of the optical sheet 51 extend. The repeating pitch V of the convexes on the optical sheet 51 satisfies the condition of the following Formula 26, where θ is the angle formed by the lengthwise direction of the cylindrical lenses 3a with the extending direction of the prismatic convexes and $P_v$ is the pixel pitch of the cylindrical lenses 3a in the lengthwise direction.

$$V \leq L \times S \times (\cos \theta)/f + P_v \times (\sin \theta) \quad \text{(Formula 26)}$$

Figure 6A:
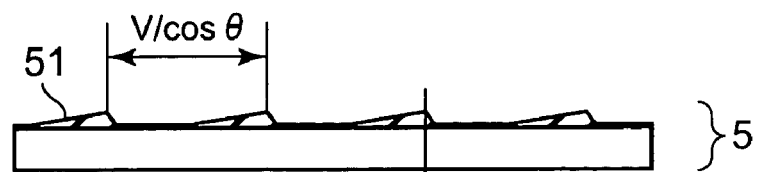
FIGS. 6(a) and 6(b) show schematic sectional views of the three-dimensional image display device, which is the third exemplary embodiment of the invention.
Figure 6B:
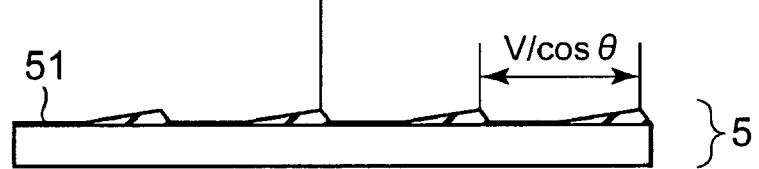

FIGS. 6(a) and 6(b) show schematic sectional views of the backlight unit of the three-dimensional image display device or this exemplary embodiment, wherein FIG. 6(a) is a sectional view along line A-A in FIG. 5 and FIG. 6(b), one along line B-B. In the three-dimensional image display device of this exemplary embodiment, as the lenticular lens 3 and the optical sheet 51 are so arranged that the angle formed between the lengthwise direction of the cylindrical lenses 3a and the extending direction of the prismatic convexes on the optical sheet 51 be θ, the relative positions of the convex shape in FIGS. 6(a) and 6(b) differ by a value ($P_v \times \tan \theta$).

The component in the arraying direction of the cylindrical lenses 3a at the convex pitch V of the optical sheet 51 is a value (V/cos θ).

As the optical sheet is inclined relative to the cylindrical lenses in this exemplary embodiment, the inclination angle θ should be considered. Further, since the cylindrical lenses have no lens action in their consecutive direction (hereinafter referred to as the longitudinal direction), there is no separating action in the longitudinal direction. Thus, while there is significant separation in the arraying direction of the lenses (hereinafter referred to as the lateral direction), no separation occurs in the longitudinal direction.

Where the optical sheet has convexes or concaves in the longitudinal direction, only the separating action of the lenses needs to be considered, but where they are arranged rotationally, the anisotropy of the lens action of the cylindrical lenses should also be considered.

In this exemplary embodiment of the invention, the absence of separating action by the cylindrical lenses in the longitudinal direction is positively utilized. The absence of separating action in the longitudinal direction means that superposition is allowed. However, if the range of superposition surpasses the pixel pitch in the longitudinal direction, differences among pixels may occur, highly likely to result in observation of unevenness. Therefore, the range of superposition in the longitudinal direction is kept within the pixel pitch in the longitudinal direction.

The difference in the relative position of the convex/concave shape in the lateral direction due to the inclination by the angle θ is $P_v \times \tan \theta$ within the longitudinal pixel pitch $P_v$. Conceivably, as a result of superposition in the longitudinal direction due to the cylindrical lens action and the rotational arrangement, the convex/concave pitch has been reduced correspondingly.

As the inherent convex/concave pitch is V and the pitch in the lateral direction is V/cos θ, the pitch where the convexes/concaves are rotationally arranged relative to the cylindrical lenses is:

$$V/\cos \theta - P_v \times \tan \theta$$

This value is to be made smaller than L×S/f as in the first exemplary embodiment of the invention.

Since the cylindrical lenses 3a have no lens effect in their consecutive direction, the effect of the optical sheet 51 can be attributed to the superposition of the convex arrangements shown in FIGS. 6(a) and 6(b). Therefore, the convexes on the optical sheet 51 become equivalent to what they are when they are arranged with their width expanded by a value ($P_v \times \tan \theta$). Further, since a component in the arraying direction of the cylindrical lenses 3a at the convex pitch V of the optical sheet 51 is represented by the value (V/cos θ), the three-dimensional image display device of this exemplary embodiment provides the same effect as the three-dimensional image display device 10 of the first exemplary embodiment described above when the following Formula 27 holds.

$$V/\cos \theta - P_v \times \tan \theta \leq L \times S/f \quad \text{(Formula 27)}$$

Additionally, Formula 27 above can be rearranged into Formula 26 stated earlier. The three-dimensional image display device 30 of this exemplary embodiment is made thinner and superior in display quality by arranging the optical sheet 51 on which convexes extending in one direction are formed at an inclination relative to the lengthwise direction of the cylindrical lenses 3a, and thereby utilizing the one-dimensional lens action of the cylindrical lenses to prevent deterioration in display quality attributable to the convexes of the optical sheet 51.

While the optical sheet 51 in the three-dimensional image display device of this exemplary embodiment is arranged rotated relative to the lengthwise direction of the cylindrical lenses 3a, it is sufficient for the extending direction of the convexes on the optical sheet 51 not to be identical with the lengthwise direction of the cylindrical lenses 3a.

For instance, the optical sheet 51 can be so arranged that the extending direction of its convexes be parallel to a certain side of the three-dimensional image display device with the lenticular lens 3 being arranged rotated. However, as an inclined arrangement of the lenticular lens 3 would make the user feel awkward, the lenticular lens 3 can be arranged so that the lengthwise direction of the cylindrical lenses 3a is parallel to one side of the display panel. This could relieve the user from the sense of awkwardness.

Further, a light dispersing member may as well be disposed between the display panel and the optical sheet 51. This can ease the influence of the directionality distribution of emitted lights attributable to the convexes of the optical sheet 51 on displayed images. As a result, a thin image display device having excellent in display quality can be obtained.

Fourth Exemplary Embodiment

Figure 7:
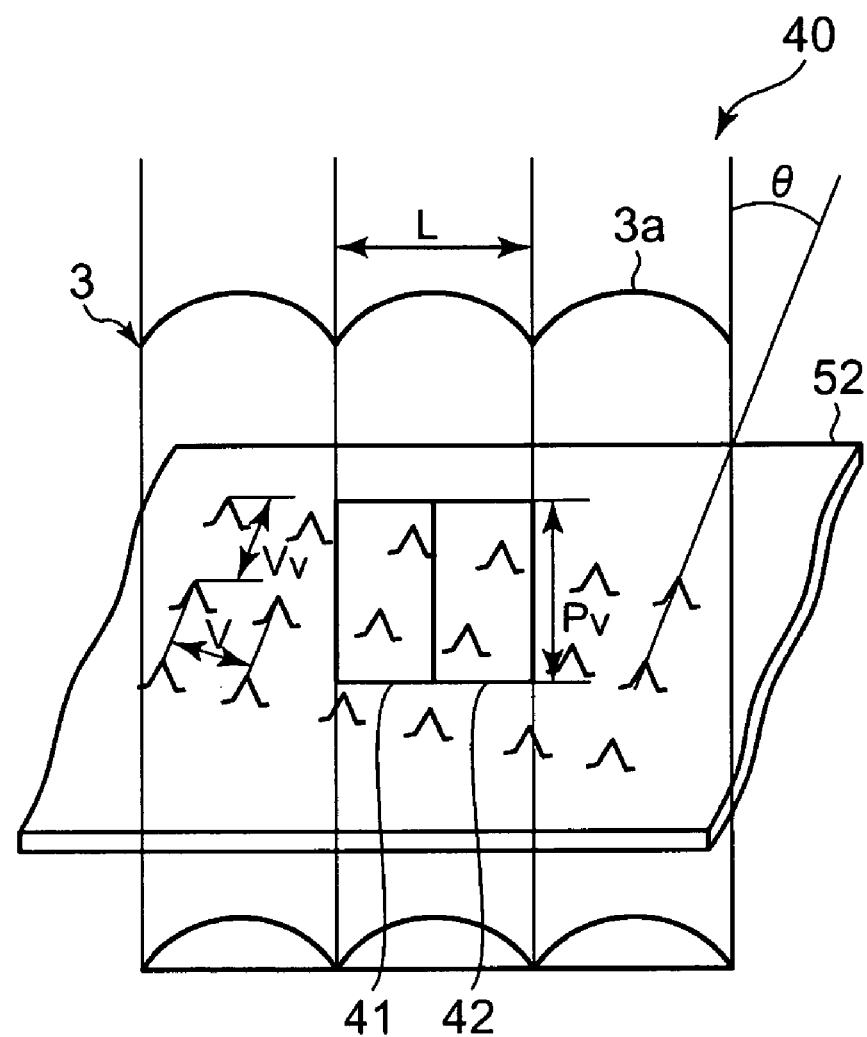
FIG. 7 shows a partial perspective view of a three-dimensional image display device, which is a fourth exemplary embodiment of the invention.

Next will be described a three-dimensional image display device, which is a fourth exemplary embodiment of the present invention. FIG. 7 shows a partial perspective view of the three-dimensional image display device of this exemplary embodiment of the invention. Incidentally, FIG. 7 shows only part of the lenticular lens, part of the optical sheet and one pair of display pixels, but the illustration of all other constituent elements is dispensed with. As shown in FIG. 7, a three-dimensional image display device 40 of this exemplary embodiment has an optical sheet 52 on which convexes are formed in a matrix shape instead of the optical sheet 51 on which convexes extending in one direction are formed. Incidentally, other aspects of the configuration of the three-dimensional image display device 40 of this exemplary embodiment are similar to the three-dimensional image display device 30 of the third exemplary embodiment described above.

In the three-dimensional image display device 40 of this exemplary embodiment, the lengthwise direction of the cylindrical lenses 3a is not identical with the direction in which prismatic convexes formed on the surface of the optical sheet 52 extend, and the pitch $V_v$ of the convexes inclined relative to the extending direction of the cylindrical lenses 3a at an angle θ satisfies the condition of the following Formula 28. Incidentally, $P_v$ in the following Formula 28 represents the pixel pitch in the lengthwise direction of the cylindrical lenses 3a.

$$V_v \times \cos\theta \leq Pv \qquad \text{(Formula 28)}$$

This exemplary embodiment, as does the third exemplary embodiment, improves display quality by utilizing the anisotropy of the lens action of the cylindrical lenses. Thus, the use of the principle of superposition in the longitudinal direction necessitates definition of the pitch in the longitudinal direction.

In the optical sheet 52 on which convexes are formed in a matrix shape, the pitch of convexes projected in the longitudinal direction is $V_v \times \cos\theta$ where $V_v$ is the convex pitch and θ is the angle of rotation of the sheet. Since a plurality of convexes can be arranged per pixel if this value is not more than the pixel pitch $P_v$ in the longitudinal direction, the influence of the convexes can be reduced.

Although the convex pitch in the lateral direction is prescribed and made extremely fine in the first and second exemplary embodiments, making it fine only in the lateral direction would invite an imbalance and make the manufacturing of the device more difficult, the effect in the longitudinal direction is also utilized.

Since this enables each pixel (the right-eye pixel 42 or left-eye pixel 41) to cover two or more convexes, it is made possible to equivalently enhance the spatial frequency of the convexes through the one-dimensional lens action of the cylindrical lenses 3a and thereby to prevent deterioration in display quality attributable to the convexes.

The three-dimensional image display device 40 of this exemplary embodiment is made thinner and superior in display quality by disposing an optical sheet 52 on which convexes extending in one direction are formed in a matrix shape at an inclination relative to the lengthwise direction of the cylindrical lenses 3a and thereby utilizing the one-dimensional lens action of the cylindrical lenses to prevent deterioration in display quality attributable to the convexes.

The use of the optical sheet 52 on which convexes are formed in a matrix shape gives the same effect as two optical sheets on which convexes extend in one direction are used. As a result, the number of constituent members can be reduced with a corresponding saving in manufacturing cost.

Fifth Exemplary Embodiment

Figure 8:
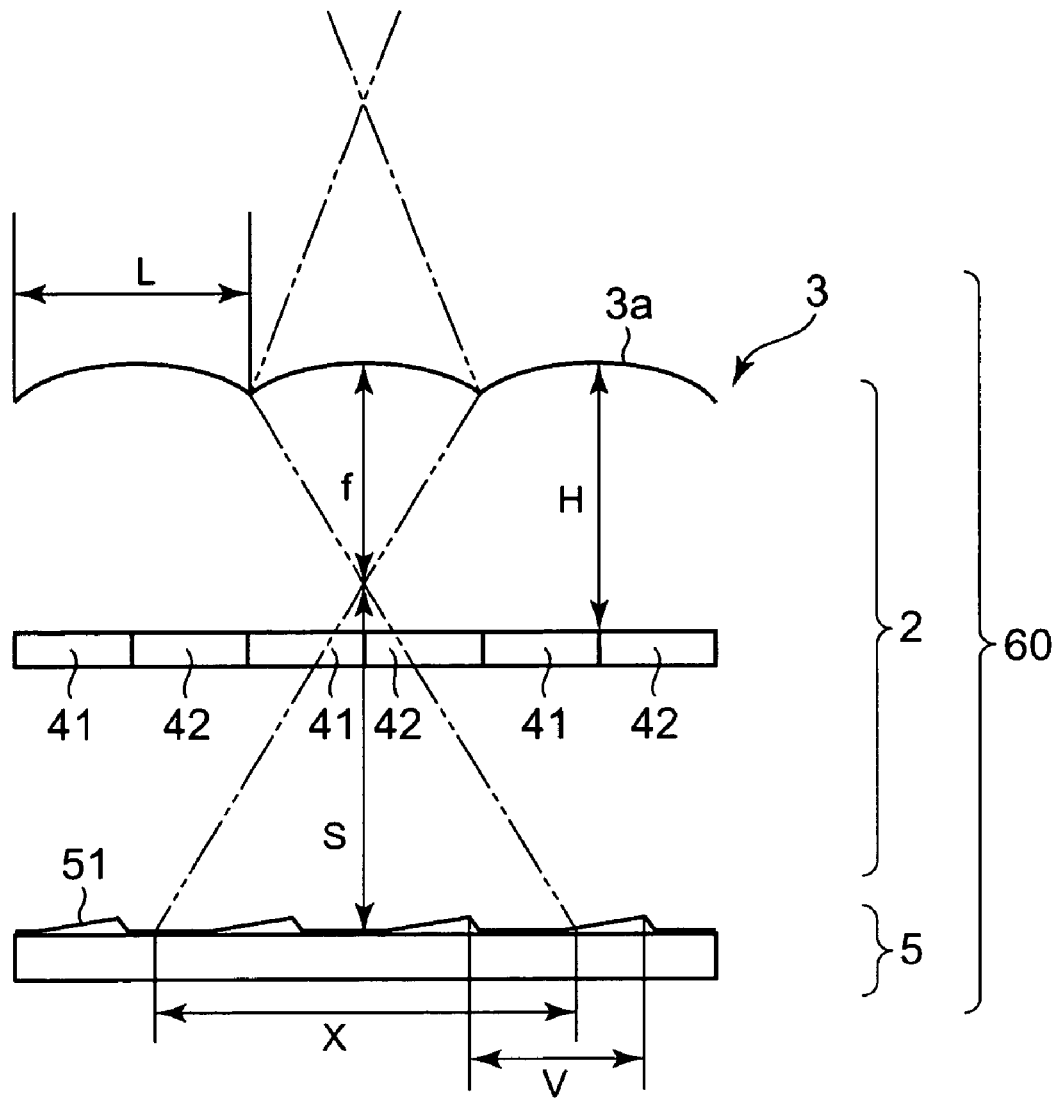
FIG. 8 shows a partial perspective view of a three-dimensional image display device, which is a fifth exemplary embodiment of the invention.

Next will be described a three-dimensional image display device, which is a fifth exemplary embodiment of the present invention. FIG. 8 is an optical model diagram illustrating the three-dimensional image display device of this exemplary embodiment. In FIG. 8, with a view to making the diagram easier to perceive, the illustration of other constituent elements than pixels on the display panel 2 is dispensed with. In a three-dimensional image display device 50 of this exemplary embodiment, the foci of the cylindrical lenses 3a forming the lenticular lens 3 are set closer than the display pixels toward the lenticular lens 3 with the result that the focal distance f is shorter than the distance H between the vertexes of the lenses and the pixels. Thus the following Formula 29 holds.

$$f < H \qquad \text{(Formula 29)}$$

In the three-dimensional image display device 50 of this exemplary embodiment, as the foci of the lenses 3a are set closer than the display pixels toward the lenticular lens 3, light rays in a broader range on the backlight unit 5 may be used.

As a result, an optical sheet longer in the convex pitch can be used, and accordingly the influence of the directionality distribution of emitted lights attributable to the convexes can be eased. Further, as the focal positions of the lenses are off the pixel surface, the influence of the non-display areas between pixels can be eased, and accordingly the deterioration of displayed images attributable to the non-display areas can also be prevented. Additionally, the other aspects of the configuration and advantages of the three-dimensional image display device 50 of this exemplary embodiment than those described above are similar to those of the three-dimensional image display device 10 of the first exemplary embodiment described earlier, though the distance from the lens focal position to the optical sheet 51 in the three-dimensional image display device 50 of this exemplary embodiment is represented by S.

Sixth Exemplary Embodiment

Figure 9:
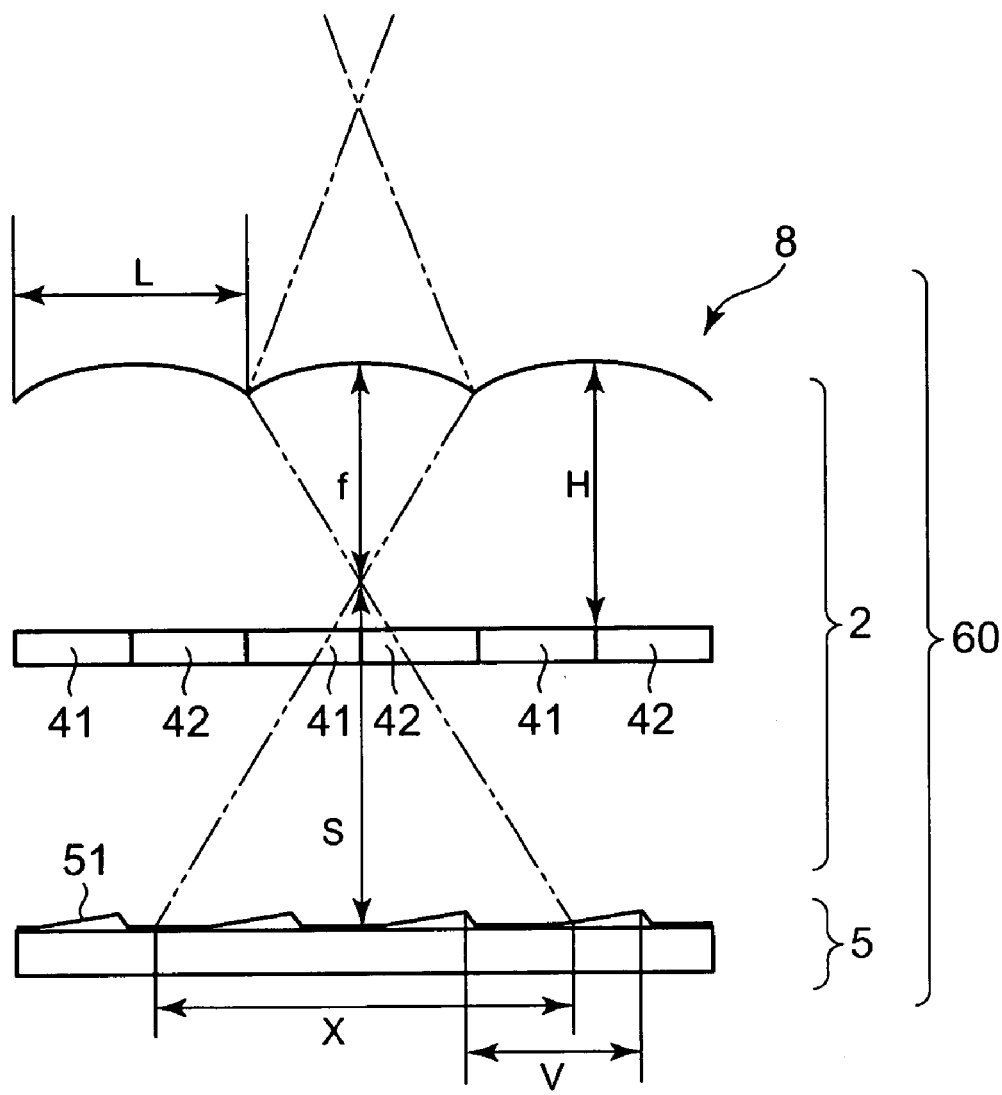
FIG. 9 shows a partial perspective view of a three-dimensional image display device, which is a sixth exemplary embodiment of the invention.

Next will be described a three-dimensional image display device, which is a sixth exemplary embodiment of the present invention. FIG. 9 is an optical model diagram illustrating the three-dimensional image display device of this exemplary embodiment. In the three-dimensional image display device of this exemplary embodiment, the foci of the lenses forming the fly-eye lens 8 are set closer than the display pixels toward the fly-eye lens 8 with the result that the focal distance f is shorter than the distance H between the vertexes of the lenses and the pixels. Accordingly the following Formula 30 holds. Additionally, the other aspects of the configuration of a three-dimensional image display device 60 of this exemplary embodiment are the same as those of the three-dimensional image display device 20 of the second exemplary embodiment described above.

$$f<H \tag{Formula 30}$$

In the three-dimensional image display device 60 of this exemplary embodiment, as the focal positions of the lenses are set closer than the display pixels toward the fly-eye lens 8, light rays in a broader range on the backlight unit 5 can be used in addition to the effects of the three-dimensional image display device 20 of the second exemplary embodiment described above. As a result, an optical sheet longer in the convex pitch may be used, and accordingly the influence of the directionality distribution of emitted lights attributable to the convexes can be eased. Further, as the focal positions of the lenses are off the pixel surface, the influence of the non-display areas between pixels can be eased, and accordingly the deterioration of displayed images attributable to the non-display areas can also be prevented.

The three-dimensional image display devices of the first through sixth exemplary embodiments may as well be two-dimensional image display devices. Such an image display device, where it is mounted on portable terminal device for instance, the user can watch images for a plurality of points of view by merely varying the angle of the portable terminal device. Especially where the images for the plurality of points of view are correlated, each image can be viewed by a simple method of changing the angle of viewing, resulting in a substantial improvement in convenience. Or where images for a plurality of points of view are arrayed in the longitudinal direction, the viewer can watch the image for each point of view with two eyes all the time, resulting in improved perceptibility of the image for each point of view. Also, a liquid crystal display panel may be used as the display panel.

Seventh Exemplary Embodiment

Figure 10:
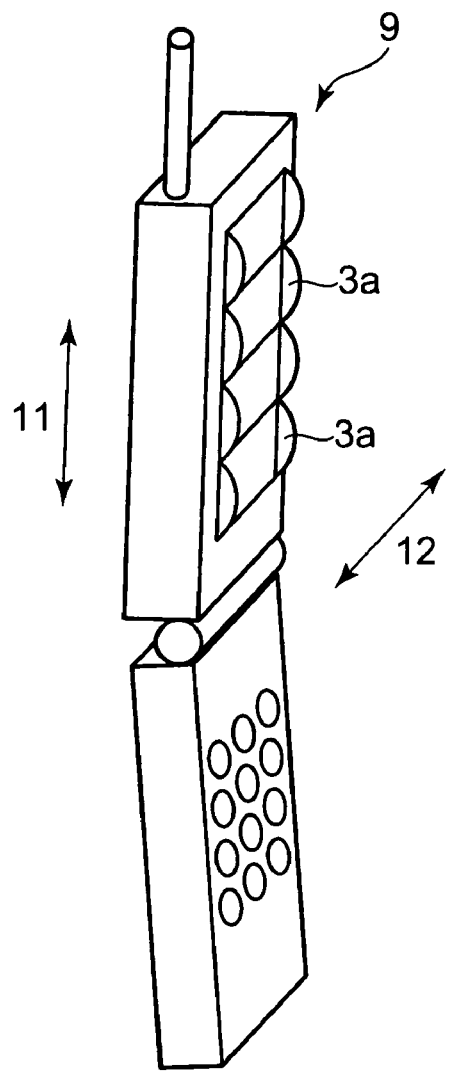
FIG. 10 shows a perspective view of a portable terminal device, which is a seventh exemplary embodiment of the invention.

Next will be described at portable terminal device, which is a seventh exemplary embodiment of the present invention. FIG. 10 shows a perspective view of the portable terminal device of this exemplary embodiment, and FIG. 11 is an optical model diagram illustrating the operation of an image display device mounted on the portable terminal device embodying the invention in this mode.

Figure 11:
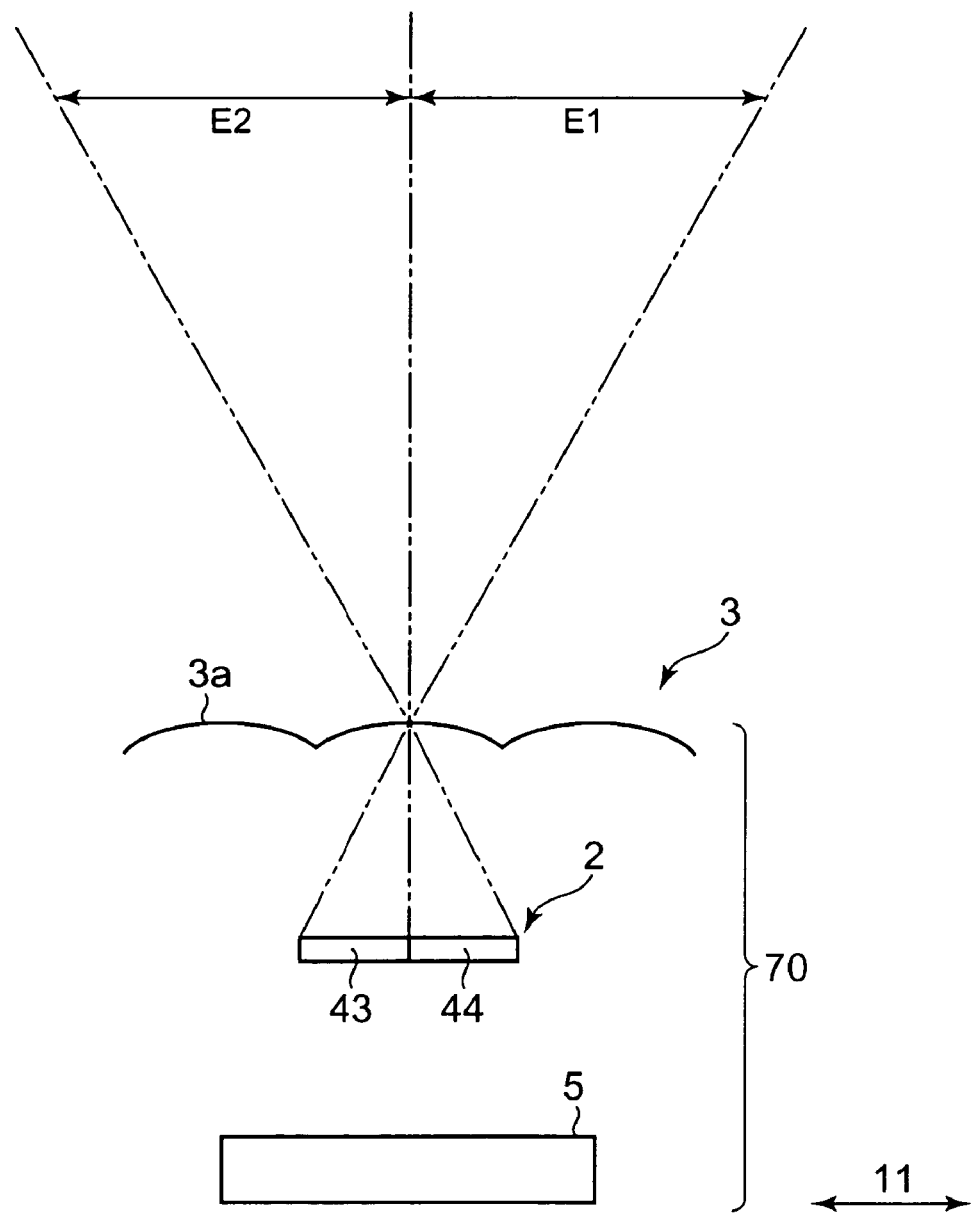
FIG. 11 is an optical model diagram illustrating the operation of the image display device embodying the invention in this mode.
Figure 12:
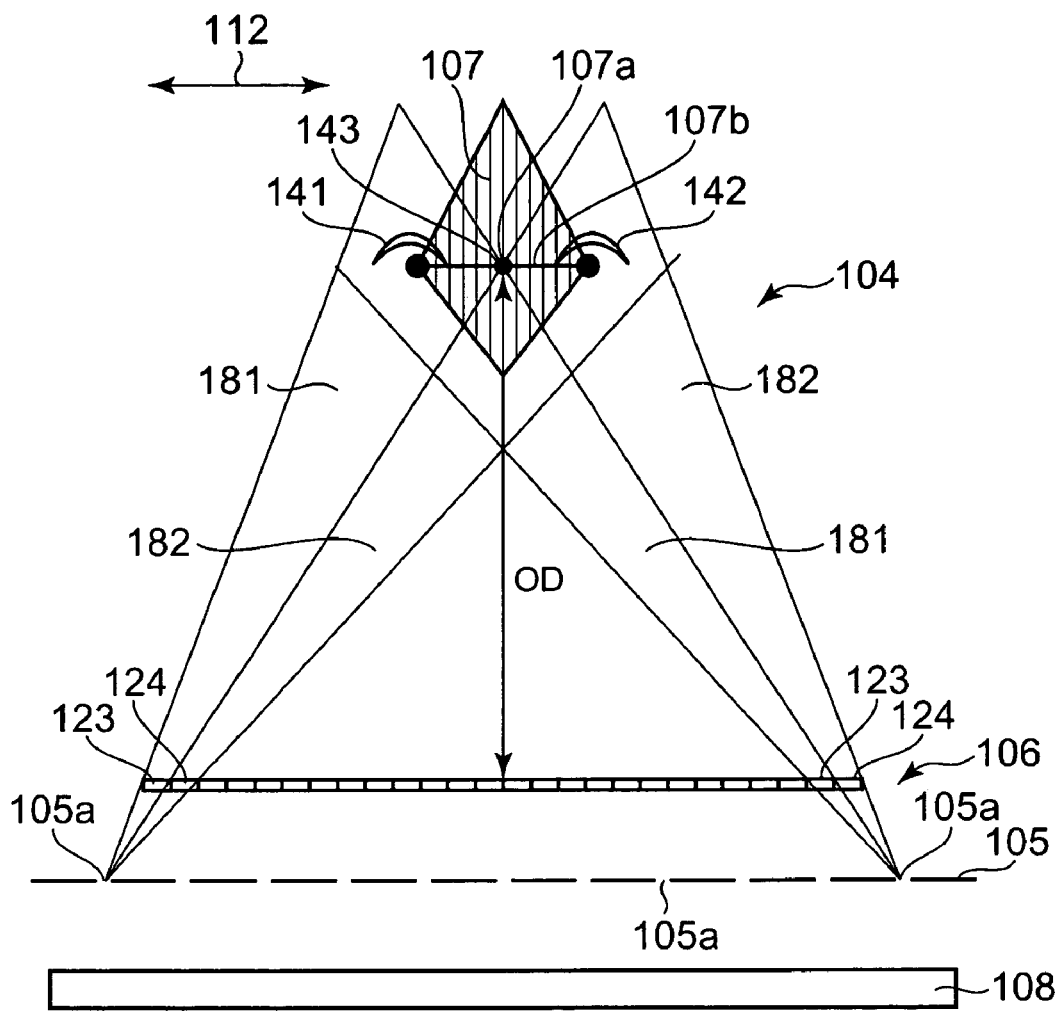
FIG. 12 is an optical model diagram illustrating a three-dimensional display method by the parallax barrier system.
Figure 13:
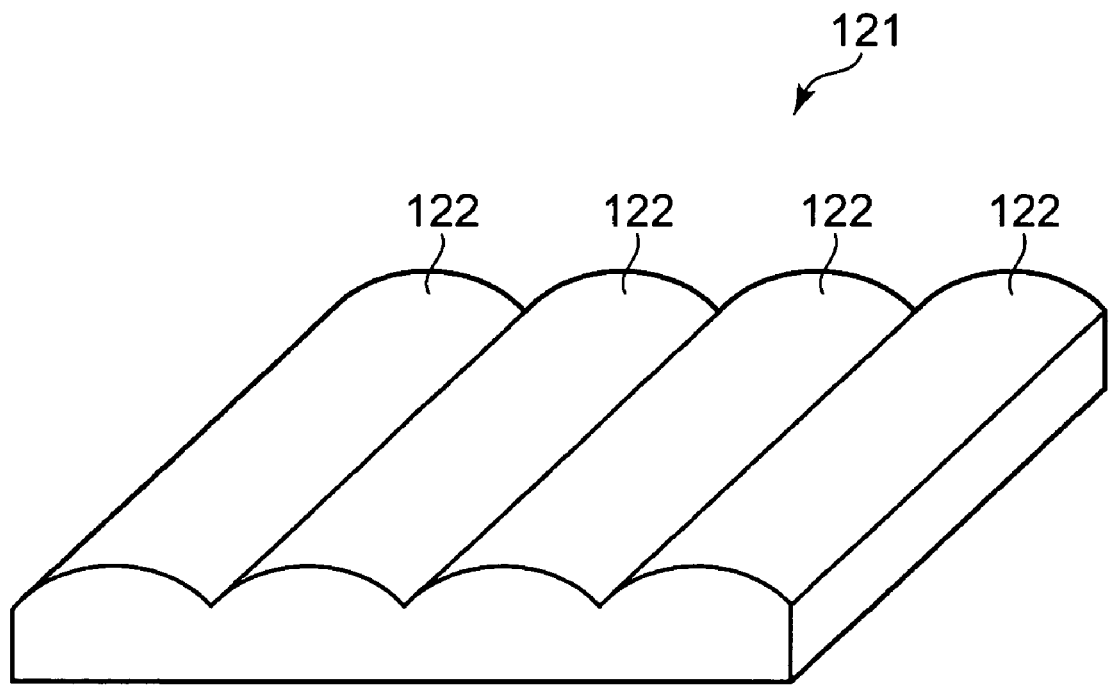
FIG. 13 shows a perspective view of a lenticular lens.
Figure 14:
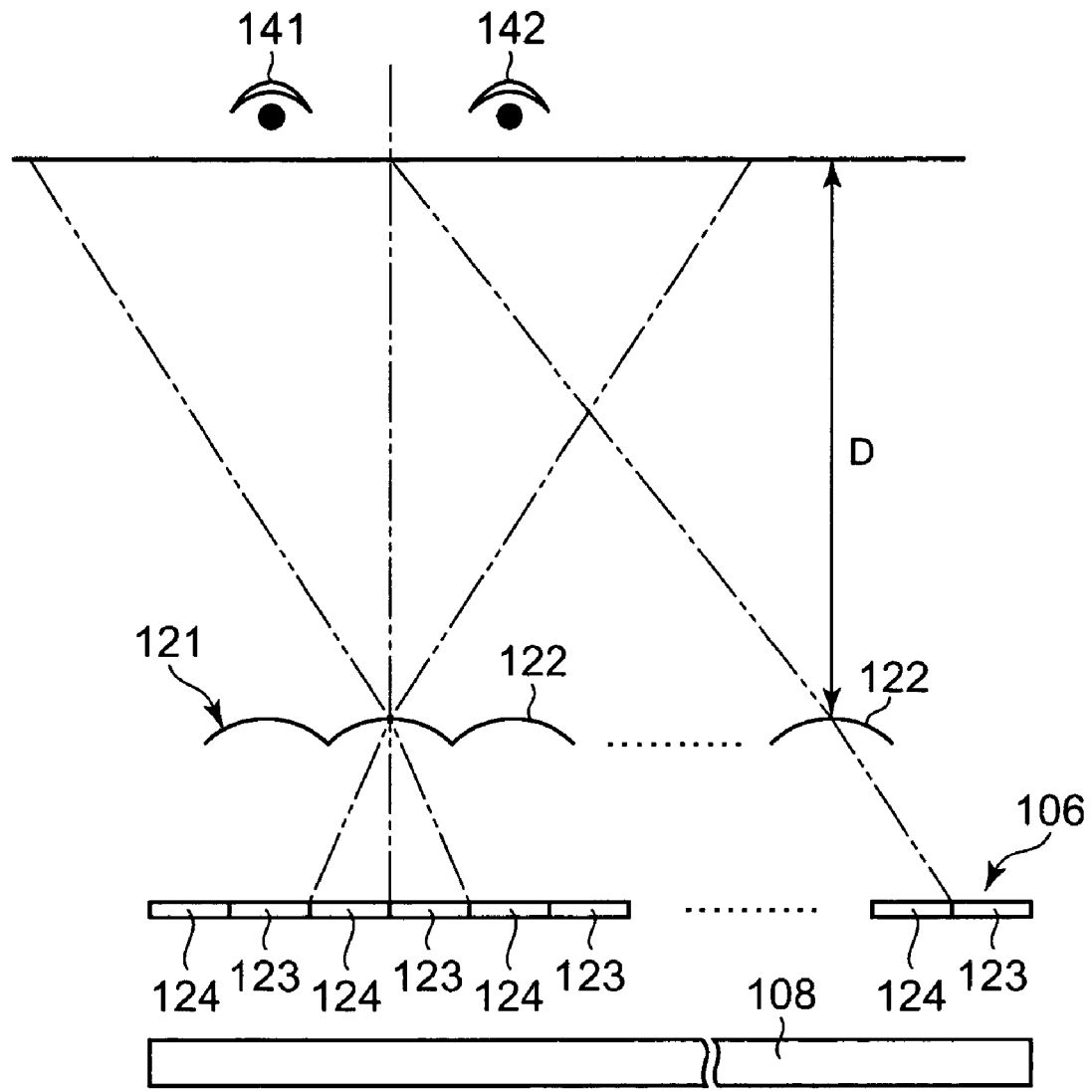
FIG. 14 is an optical model diagram illustrating a three-dimensional display method by the lenticular lens type.
Figure 15:
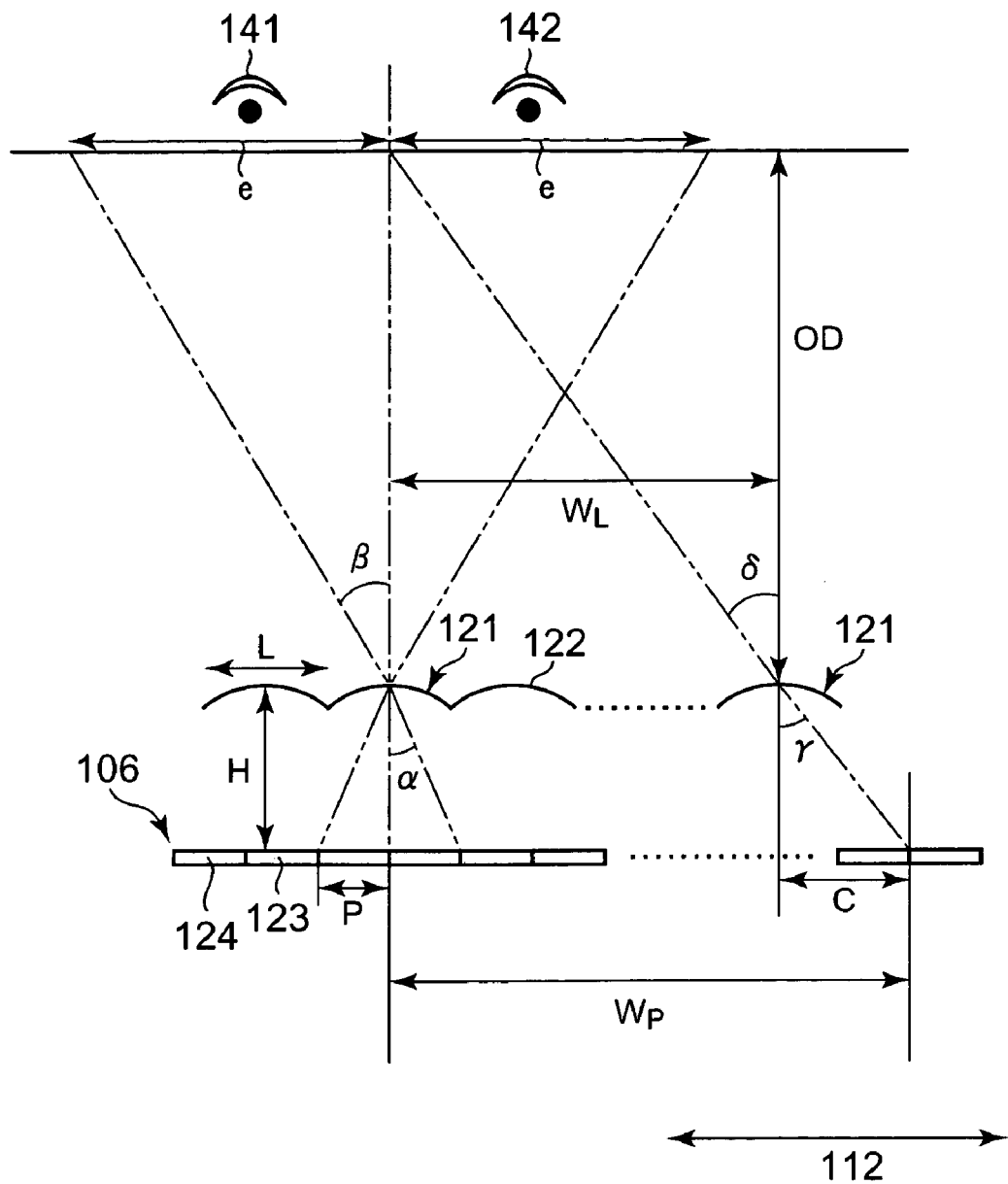
FIG. 15 is an optical model diagram of a twin-lens three-dimensional image display device equipped with a conventional lenticular lens type.

As shown in FIG. 10 and FIG. 11, a portable terminal device 9 of this exemplary embodiment is a cellular phone with an image display device 70 built into it. In this portable terminal device 9, the arraying direction of the cylindrical lenses 3a forming the lenticular lens 3 is a longitudinal direction 11, i.e. the vertical direction of images, and the lengthwise direction of the cylindrical lenses 3a is a lateral direction 12, i.e. the horizontal direction of images. The arraying direction of the first-viewpoint pixels 43 and the second-viewpoint pixels 44 in one pair of display pixels of the display panel is a longitudinal direction 11, the same as the arraying direction of the cylindrical lenses 3a. Incidentally, though only four of the cylindrical lenses 3a are shown in FIG. 10 with a view to simplifying the illustration, actually as many cylindrical lenses 3a as the arrays of display pixels in the longitudinal direction 11 are formed. The other aspects of the configuration of the image display device 70 in the portable terminal device 9 of this exemplary embodiment are the same as those of the three-dimensional image display device 10 in the first exemplary embodiment described earlier.

Next will be described the operation of the image display device 70 in the portable terminal device 9 of this exemplary embodiment. As shown in FIG. 11, the backlight unit 5 emits lights, which are incident on the display panel 2. Then, the first-viewpoint pixels 43 of the display panel 2 display a first-viewpoint image, and the second-viewpoint pixels 44 display a second-viewpoint image. The lights being incident on the first-viewpoint pixels 43 and the second-viewpoint pixels 44 of the display panel 2 are transmitted by these pixels, and travel toward the lenticular lens 3. These lights are refracted by the cylindrical lenses 3a of the lenticular lens 3, and are emitted toward areas E1 and E2. The areas and E1 and E2 are arrayed in the longitudinal direction 11. If then the viewer positions his eyes on the area E1, he can view the first-viewpoint image or, if he positions his eyes on the area E2, he can view the second-viewpoint image.

The portable terminal device 9 of this exemplary embodiment has an advantage that the viewer can position both his eyes on the area E1 or E2 by merely varying the angle of the portable terminal device 9, and thereby watch the first-viewpoint image or the second-viewpoint image. Especially where the first-viewpoint image and the second-viewpoint image are correlated, he can view each image by a simple method of changing the angle of viewing, resulting in a substantial improvement in convenience.

Incidentally, if images for a plurality of points of view were arrayed in a lateral direction, there would be a position where the right eye and the left eye see images from different points of view, and the viewer would be so confused as to be unable to perceive the image from each point of view. Where images for a plurality of points of view are arrayed in the longitudinal direction as in this exemplary embodiment of the invention, the viewer can always watch images for different points of view with both eyes and accordingly can readily perceive these images. Other advantages of the portable terminal device 9 of this exemplary embodiment are similar to those of the three-dimensional image display device of the first exemplary embodiment described earlier. This seventh exemplary embodiment can as well be applied to the three-dimensional image display devices of the third, fourth and fifth exemplary embodiments described above.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is the inventor's intent to retain all equivalents of the claimed invention even if the claims are amended during prosecution.

What is claimed is:

1. An image display device comprising:
   a display panel in which a plurality of display units including at least pixels for displaying an image for a first point of view and a second point of view are arrayed in a matrix shape;
   a lens for distributing lights transmitted through pixels for said first point of view and lights transmitted through pixels for said second point of view into mutually different directions; and
   a backlight which has a plurality of convexes or concaves which refract lights, wherein:
   a following formula is satisfied regarding a distance V between adjoining convexes or concaves in said backlight, where S is a distance between said pixels and said convexes or concaves, f is a focal distance of said lens, and L is an array cycle of said lens:

$V \leq L*S/f.$

2. The image display device, as claimed in claim 1, wherein said focal distance f is shorter than the distance between said lens and said pixels.

3. The image display device, as claimed in claim 1, wherein said distance V is a minimum of possible distances between adjoining convexes or concaves.

4. The image display device, as claimed in claim 1, wherein said lens comprises a lenticular lens in which a plurality of cylindrical lenses are so arrayed as to be in parallel with one another in their lengthwise direction.

5. The image display device, as claimed in claim 4, wherein said convexes or concaves extend in one direction, and an extending direction of said convexes or concaves and the lengthwise direction of said cylindrical lenses are parallel to each other.

6. The image display device, as claimed in claim 4, wherein said convexes or concaves are formed in a matrix shape.

7. The image display device, as claimed in claim 1, wherein said lens comprises a fly-eye lens in which a plurality of convex lenses are arrayed in a matrix shape.

8. The image display device, as claimed in claim 1, further comprising a light dispersing member disposed between said display panel and said backlight.

9. The image display device, as claimed in claim 1, which comprises a three-dimensional image display device.

10. The image display device, as claimed in claim 1, which comprises a two-dimensional image display device.

11. The image display device, as claimed in claim 1, wherein said display panel comprises a liquid crystal display panel.

12. A portable terminal device having the image display device claimed in claim 1.

13. The image display device, as claimed in claim 1, wherein said pixels are positioned at a distance from said lens equal to said focal distance f of said lens.

14. An image display device, comprising:
   a display panel in which a plurality of display units including at least pixels for displaying an image for a first point of view and a second point of view are arrayed in a matrix shape;
   a lens for distributing lights transmitted through pixels for said first point of view and lights transmitted through pixels for said second point of view into mutually different directions; and
   a backlight which has a plurality of convexes or concaves which refract lights,
   wherein a distance between adjoining convexes or concaves on said backlight is not longer than 0.6 mm.

15. The image display device, as claimed in claim 14, wherein said lens comprises a lenticular lens in which a plurality of cylindrical lenses are so arrayed as to be in parallel with one another in their lengthwise direction.

16. The image display device, as claimed in claim 4, wherein said lens comprises a fly-eye lens in which a plurality of convex lenses are arrayed in a matrix shape.

17. An image display device comprising:
   a display panel in which a plurality of display units including at least pixels for displaying an image for a first point of view and a second point of view are arrayed in a matrix shape;
   a lenticular lens provided with cylindrical lenses for distributing lights transmitted through pixels for said first point of view and lights transmitted through pixels for said second point of view into mutually different directions; and
   a backlight which has a plurality of convexes or concaves which refract lights, inclined by an angle θ to a lengthwise direction of said cylindrical lenses, wherein:
   a following formula holds true regarding a distance V between adjoining convexes or concaves in said backlight, where:
   S is a distance between said pixels and said convexes or concaves,
   f is a focal distance of said lens,
   L is an array cycle of said lens, and
   Pv is a pixel pitch in the lengthwise direction of said cylindrical lenses:

$V \leq L*S*\cos\theta/f + Pv*\sin\theta.$

18. The image display device, as claimed in claim 17, wherein said lenticular lens is arranged so that one side of said display panel and the lengthwise direction of said cylindrical lenses are parallel to each other.

19. The image display device, as claimed in claim 17, wherein said focal distance f is shorter than a distance between said lenticular lens and said pixels.

20. An image display device, comprising:
   a display panel in which a plurality of display units including at least pixels for displaying an image for a first point of view and a second point of view are arrayed in a matrix shape;
   a lenticular lens provided with cylindrical lenses for distributing lights transmitted through pixels for said first point of view and lights transmitted through pixels for said second point of view into mutually different directions; and
   a backlight which has a plurality of convexes or concaves which refract lights, wherein:
   following formulas hold true respectively regarding a distance Vv between adjoining convexes or concaves in said backlight in a direction inclined by an angle θ to a lengthwise direction of said cylindrical lenses and a distance V between adjoining convexes or concaves in said backlight in a direction orthogonal to the direction inclined by the angle θ to the lengthwise direction of said cylindrical lenses, where:
   S is a distance between said pixels and said convexes or concaves,
   f is a focal distance of said lens,
   L is an array cycle of said lens, and
   Pv is a pixel pitch in the lengthwise direction of said cylindrical lenses:

$Vv \leq Pv/\cos\theta$ $V \leq L*S*\cos\theta/f + Pv*\sin\theta.$

21. The image display device, as claimed in claim 20, wherein said lenticular lens is arranged so that one side of said display panel and the lengthwise direction of said cylindrical lenses are parallel to each other.

22. The image display device, as claimed in claim 20, wherein said focal distance f is shorter than a distance between said lenticular lens and said pixels.

23. An image display device, comprising:
a lens for distributing a plurality of image;
a means for displaying said plurality of image; and
a means for illuminating said displaying means, on whose face a plurality of convexes or concaves are formed, wherein:
a following formula is satisfied regarding a distance V between adjoining convexes or concaves in said illuminating means, where S is the distance between said displaying means and said convexes or concaves, f is a focal distance of said lens, and L is an array cycle of said lens:

$$V \leq L*s/f.$$

24. A method of reducing a thickness of an image display device without sacrificing display quality, said image display device comprising a display panel in which a plurality of display units including at least pixels for displaying an image for a first point of view and a second point of view are arrayed in a matrix shape, a lens for distributing lights transmitted through pixels for said first point of view and lights transmitted through pixels for said second point of view into mutually different directions, and a backlight which has a plurality of convexes or concaves which refract lights, wherein said method comprises:
forming said backlight such that a distance V between adjoining convexes or concaves in said backlight is less than or equal to (L*S/f), where S is a distance between said pixels and said convexes or concaves, f is a focal distance of said lens, and L is an array cycle of said lens.

* * * * *